United States Patent [19]
O'Reilly et al.

[11] Patent Number: 5,697,525
[45] Date of Patent: Dec. 16, 1997

[54] BAG FOR DISPENSING FLUID MATERIAL AND A DISPENSER HAVING THE BAG

[75] Inventors: Daniel Joseph O'Reilly, "Tara", Coney Weston Road, Sapiston, Suffolk, IP31 1RX, United Kingdom; John Maloney, Wetherby, United Kingdom

[73] Assignee: Daniel Joseph O'Reilly, Sapiston, United Kingdom

[21] Appl. No.: 505,272

[22] PCT Filed: Feb. 7, 1994

[86] PCT No.: PCT/GB94/00225

§ 371 Date: Jul. 31, 1995

§ 102(e) Date: Jul. 31, 1995

[87] PCT Pub. No.: WO94/17712

PCT Pub. Date: Aug. 18, 1994

[30] Foreign Application Priority Data

Feb. 10, 1993 [GB] United Kingdom ............... 9302594
Jul. 15, 1993 [GB] United Kingdom ............... 9314699
Jul. 27, 1993 [GB] United Kingdom ............... 9315463

[51] Int. Cl.$^6$ ............................................. B65D 35/56
[52] U.S. Cl. ........................................ 222/105; 222/494
[58] Field of Search .................... 222/92, 105, 207, 222/209, 212–214, 490, 494, 541.3, 380, 383.1, 496, 444, 445, 448, 450

[56] References Cited

U.S. PATENT DOCUMENTS

| | | |
|---|---|---|
| 2,772,817 | 12/1956 | Jauch . |
| 3,485,419 | 12/1969 | Taylor .................................. 222/494 |
| 3,829,342 | 8/1974 | Prisk . |
| 4,573,612 | 3/1986 | Maddison et al. ..................... 222/214 |
| 4,776,495 | 10/1988 | Vignot ................................... 222/494 |
| 5,176,510 | 1/1993 | Nilsson ................................. 222/494 |
| 5,242,083 | 9/1993 | Christine et al. ..................... 222/105 |

FOREIGN PATENT DOCUMENTS

| | | |
|---|---|---|
| 0 329 532 | 2/1989 | European Pat. Off. . |
| 345439 | 3/1960 | Switzerland . |
| 2 025 515 | 1/1980 | United Kingdom . |
| 2 283 007 | 4/1995 | United Kingdom . |

*Primary Examiner*—Philippe Derakshani
*Attorney, Agent, or Firm*—Iandiorio & Teska

[57] ABSTRACT

A bag (44) for dispensing fluid material (48), comprising a storage portion (50), a dispensing portion (52), a first non-return valve (54) for controlling the passage of the fluid material (48) between the storage portion (50) and the dispensing portion (52), and a second non-return valve (56) for controlling the dispensation of the fluid material (48) from the dispensing portion (52). The first and the second non-return valves (54, 56) have flaps of material formed by sealing during formation of the bag (44). A dispenser (46) containing the bag (44) is also provided.

9 Claims, 20 Drawing Sheets

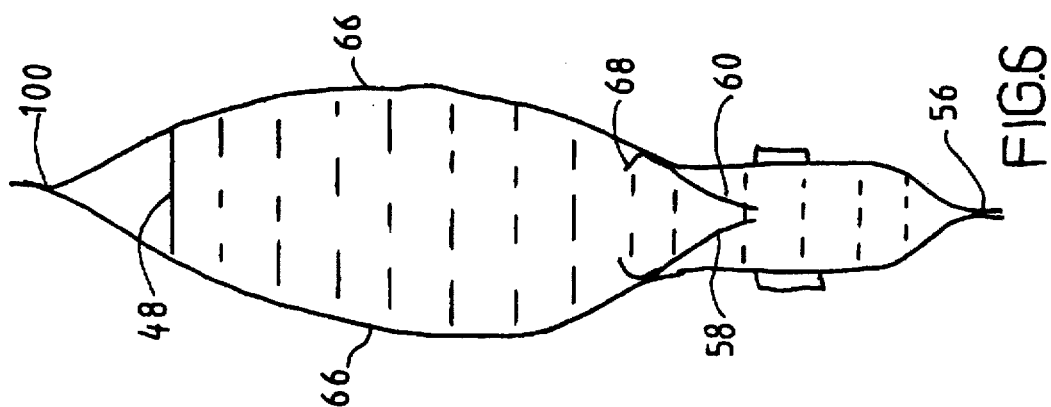
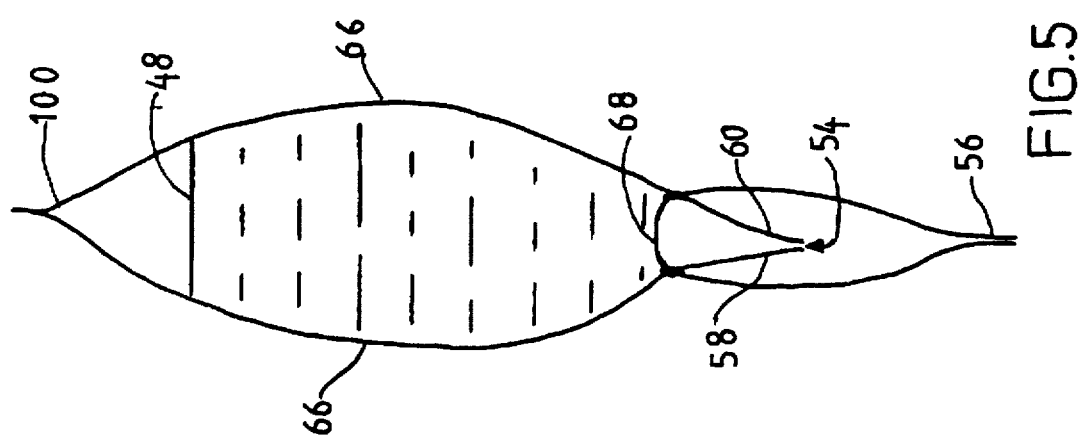
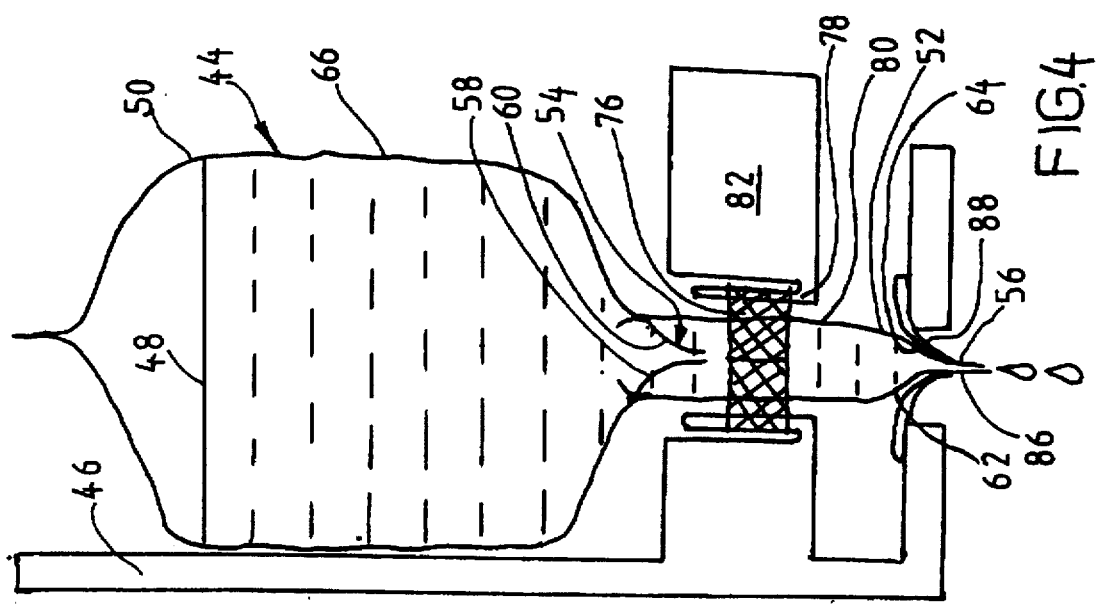

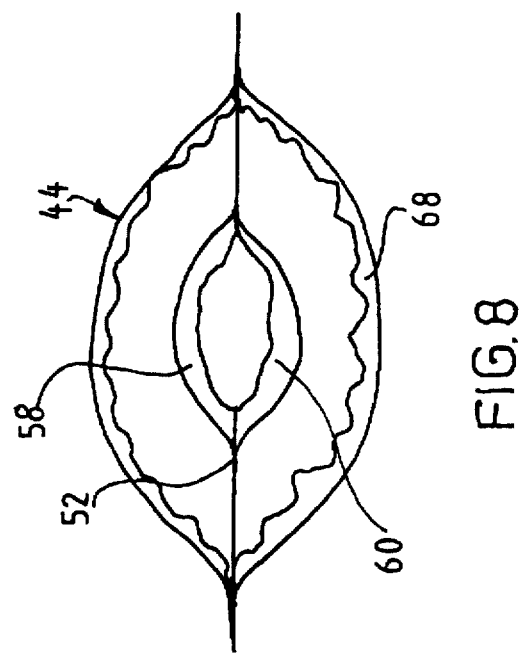
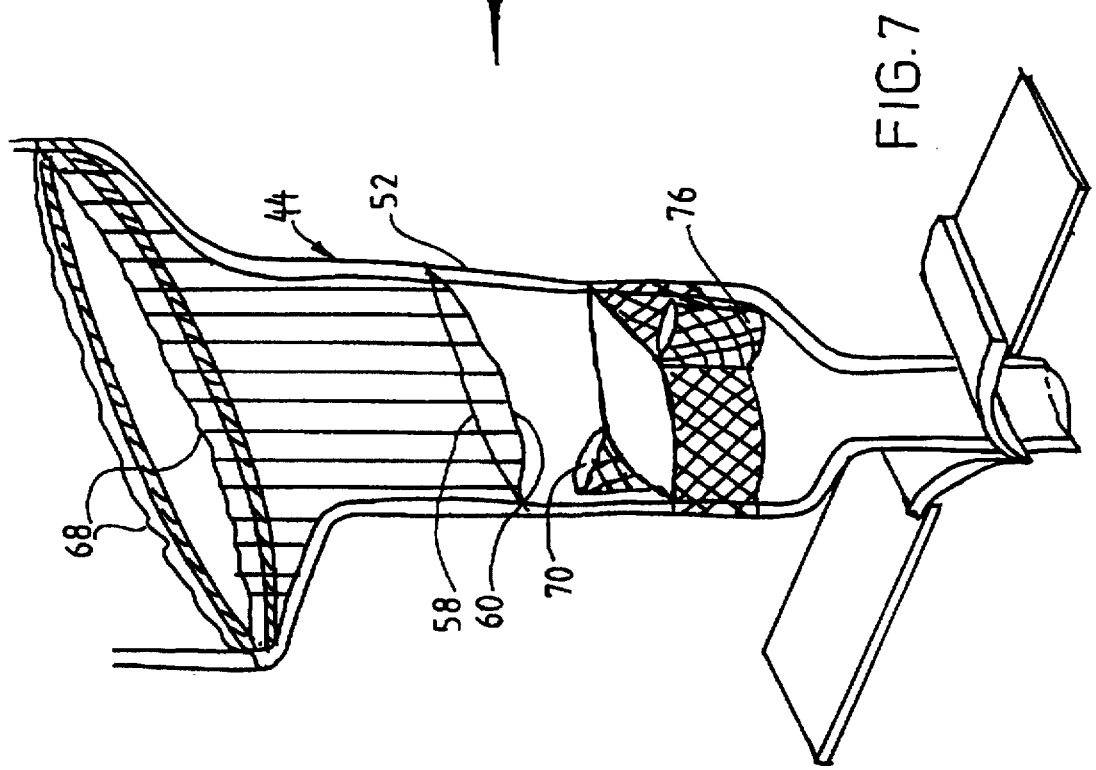

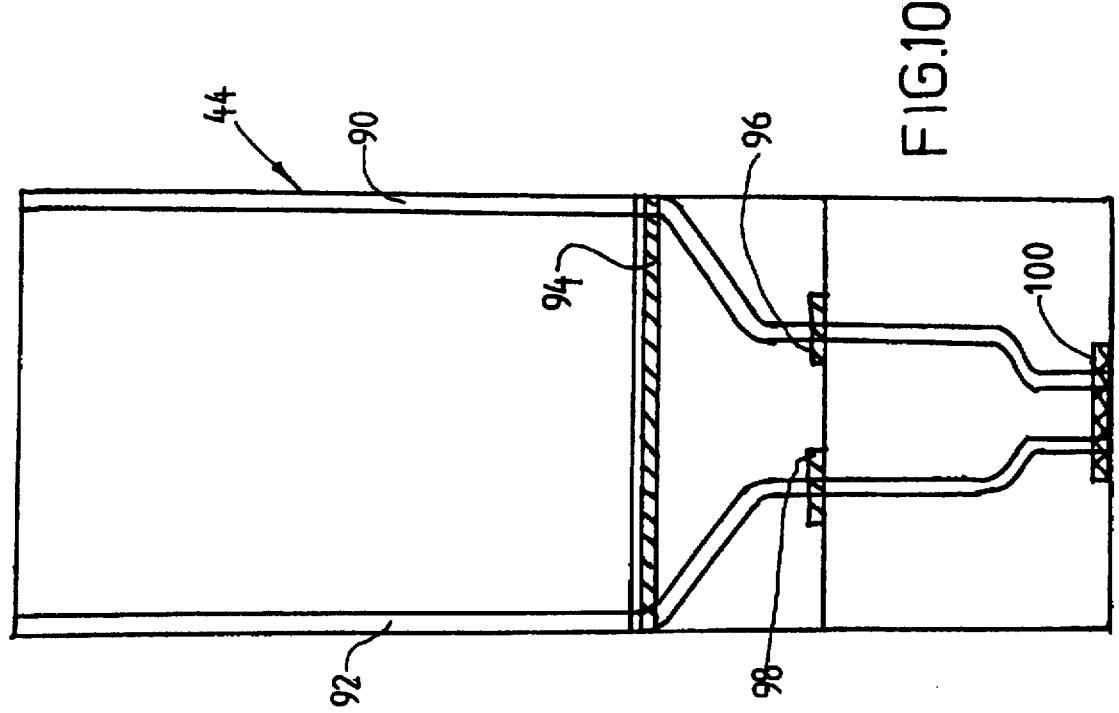
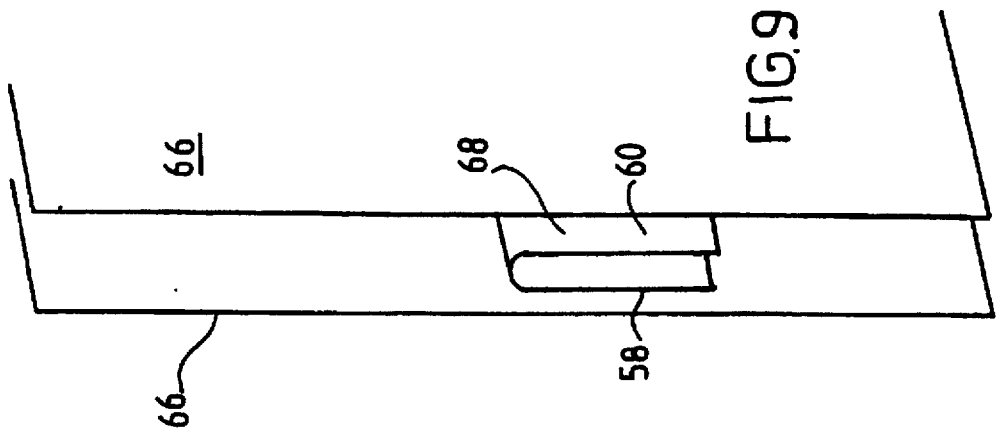

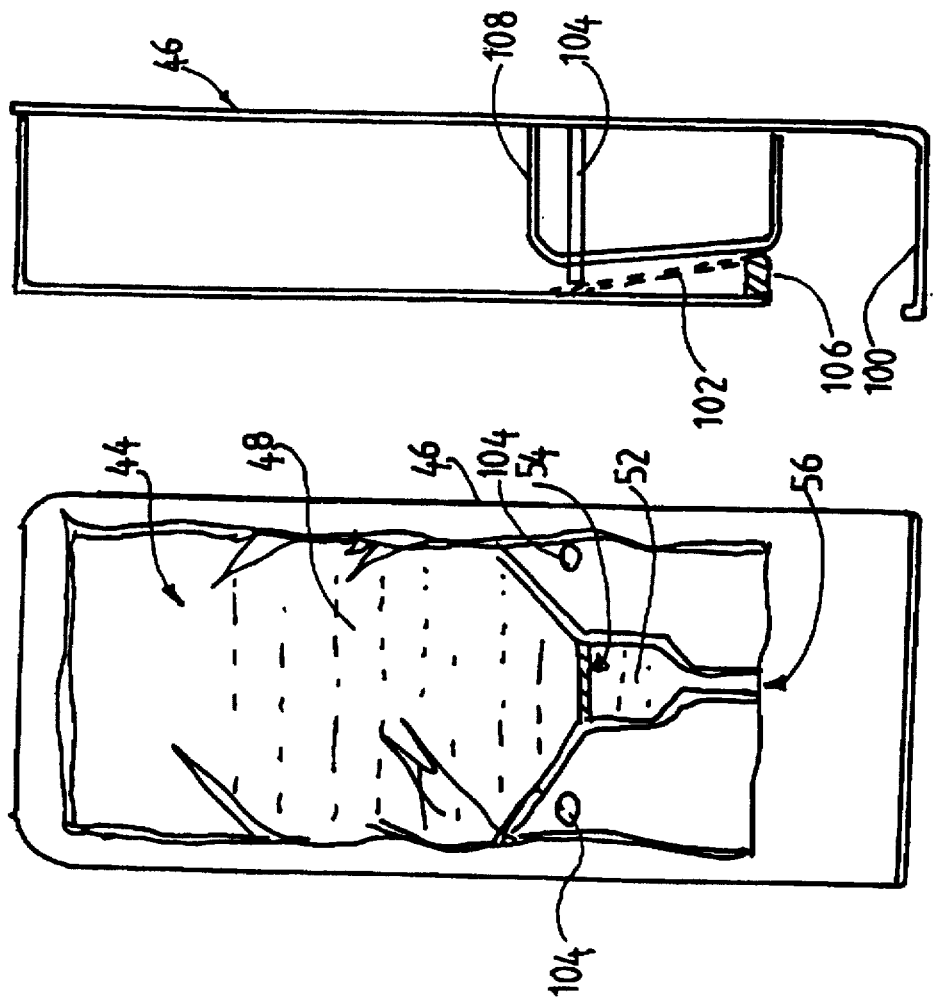
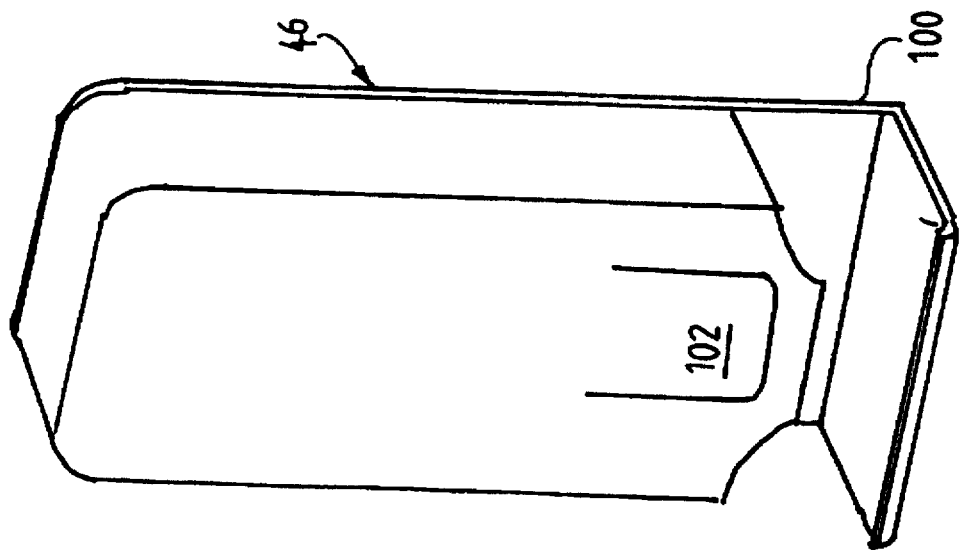

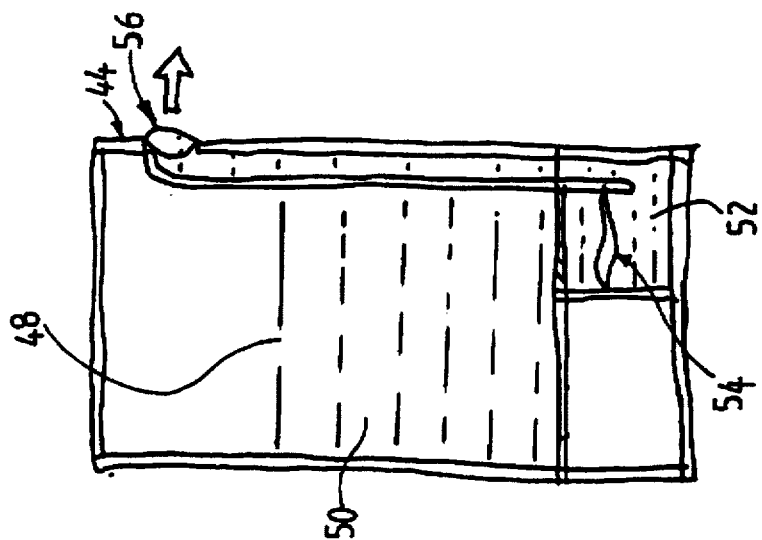
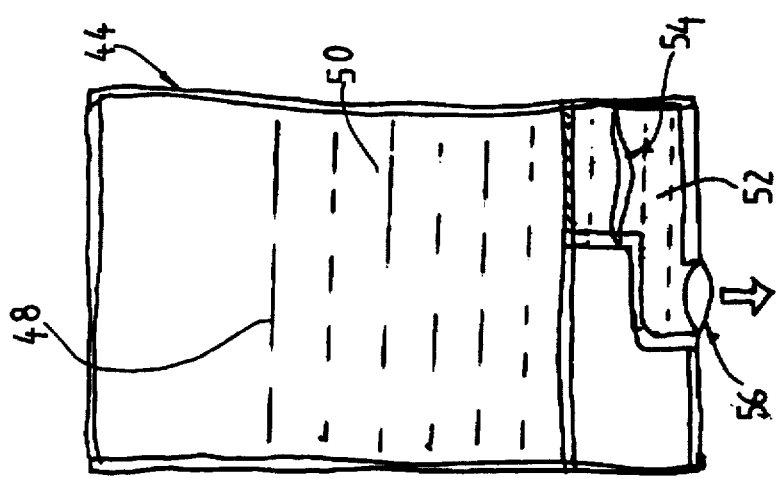
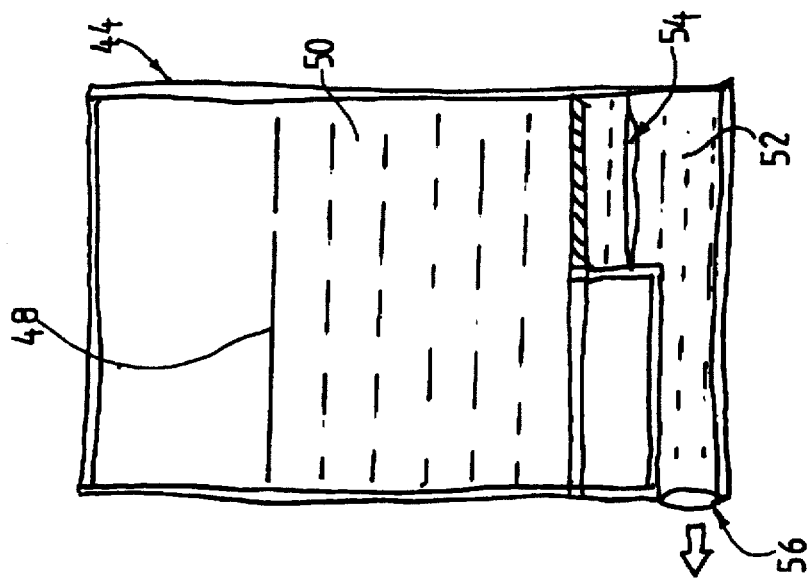

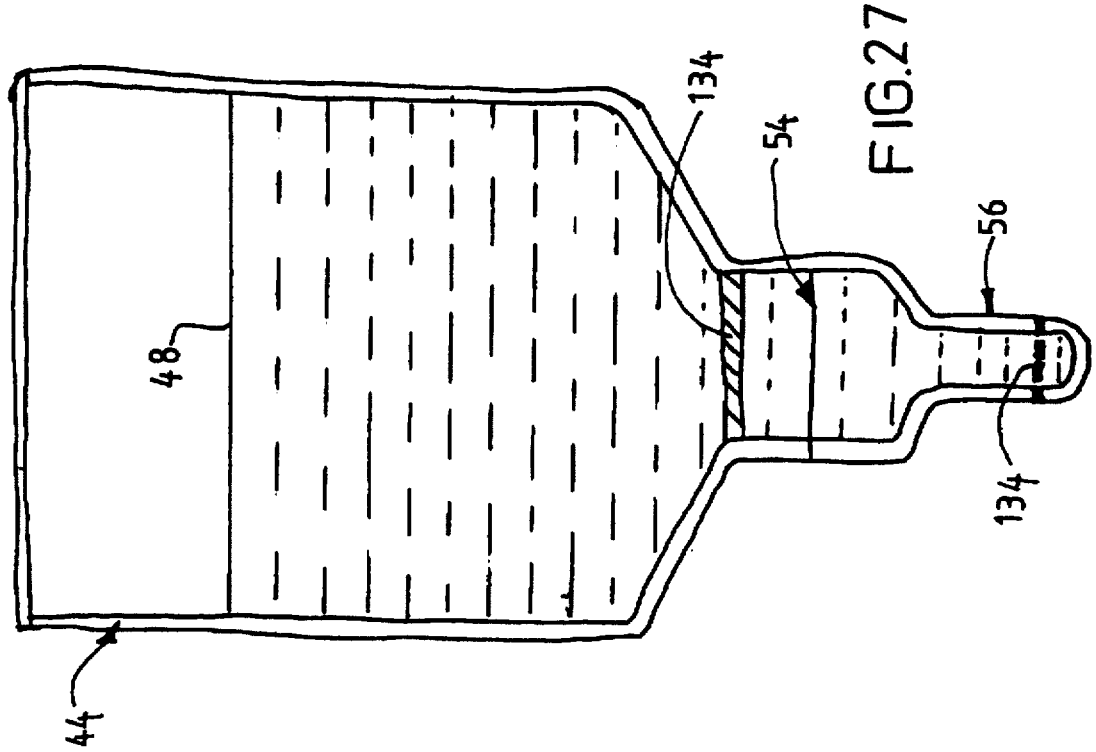
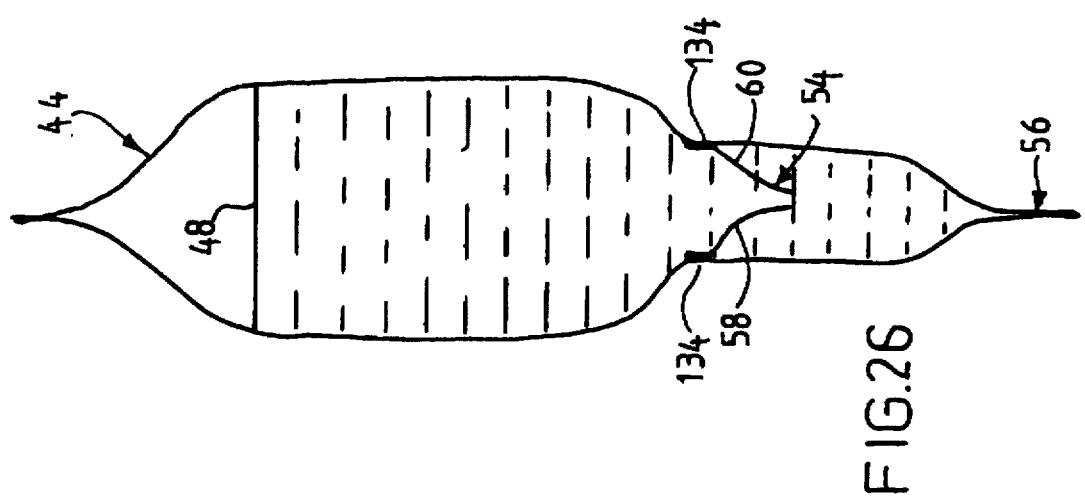

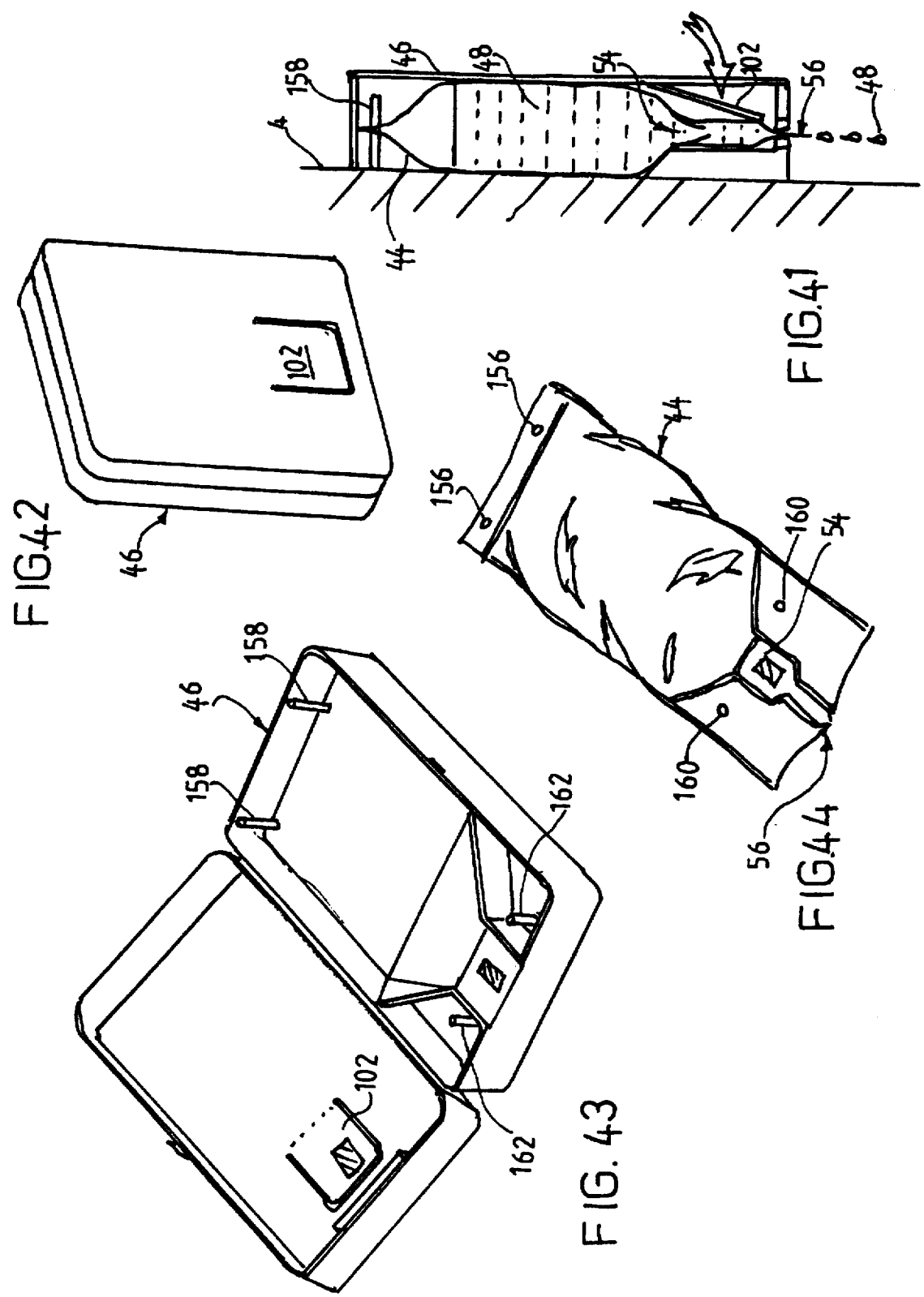

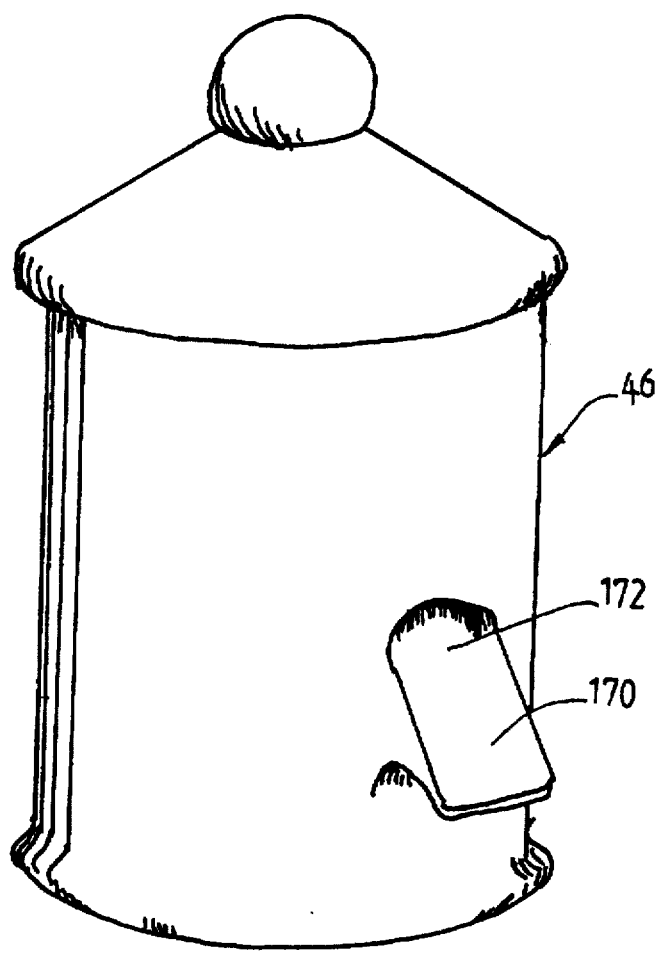
FIG.55
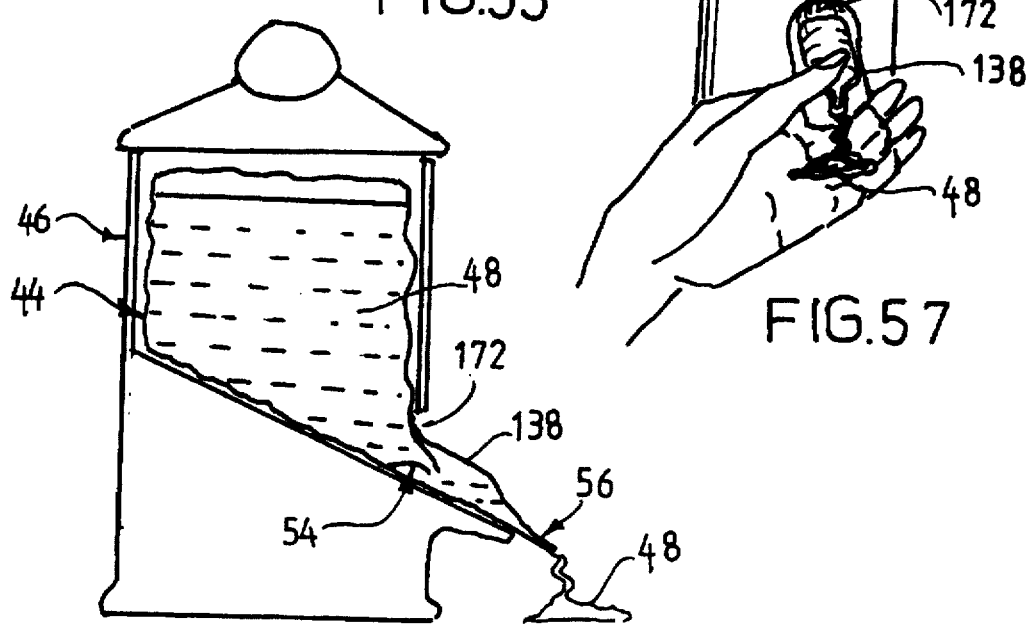
FIG.56
FIG.57

BAG FOR DISPENSING FLUID MATERIAL AND A DISPENSER HAVING THE BAG

This invention relates to a bag for dispensing fluid material such for example as liquids and creams.

DESCRIPTION OF PRIOR ART

Wall mounted dispensers for dispensing liquids and creams are known. They usually incorporate either an expensive pump or a disposable bag which has a deformable tube sealed into the bag, the deformable tube containing expensive mechanical non-return valves.

It is an aim of the present invention to provide a bag for dispensing fluid material which incorporates non-return valves which are considerably cheaper than the known expensive pumps and non-return valves.

SUMMARY OF THE INVENTION

Accordingly, in one non-limiting embodiment of the present invention there is provided a bag for dispensing fluid material, which bag comprises a storage portion for storing the fluid material, a dispensing portion for receiving the fluid material from the storage portion, a first non-return valve for controlling the passage of the fluid material between the storage portion and the dispensing portion, and a second non-return valve for controlling the dispensation of the fluid material from the dispensing portion: the first and the second non-return valves each having flaps of material formed by sealing during the formation of the bag; and the first and the second non-return valves being such that the first non-return valve closes when the second non-return valve opens for fluid dispensing purposes, and the first non-return valve opens when the second non-return valve closes, whereby in use the bag operates such that when the dispensing portion is squeezed the fluid material is dispensed from the dispensing portion without being forced back into the storage portion, and such that after the dispensation of the fluid material, the dispensing portion is replenishable with fluid material from the storage portion.

The bag may be used for dispensing any suitable and appropriate type of fluid material. The fluid material may thus be a liquid such for example as liquid soap. The fluid material may be a cream such for example as a soap cream or hair cream. The fluid material may be a gel such for example as hair gel. The fluid material may also be a powder. Because the non-return valves are made of the flaps of material formed by sealing during formation of the bag, the bag can be produced in a very simple and cost effective manner.

Usually, the dispensing portion will be narrower than the storage portion. The dispensing portion may form a neck portion of the bag.

The first non-return valve may comprise a pair of flaps which are positioned inside the bag and which are separate from side walls of the bag.

Advantageously, the pair of flaps are formed to be joined together to seal the storage portion from the dispensing portion until such time as the bag is to be used. This stops the possibility of leakage of the fluid material from the dispensing portion though the second non-return valve, for example during storage of full bags when the bags are stacked on top of one another in containers such as cartons or cases.

Preferably, the pair of flaps are constructed to be separable from one another by the application of pressure to the storage portion. In order to achieve this, the pair of flaps may be formed from a thinner material than the material of side walls of the bag, whereby the thinner material is caused by the pressure to rupture. Alternatively or in addition, the pair of flaps may be constructed to be separable from each other by having a joining portion provided with one or more areas of weakness such for example as a row of depressions extending nearly through the material of the connecting portion or a slot extending nearly through the material of the connecting portion.

Preferably, the second non-return valve is formed by side wall portions of the dispensing portion of the bag.

The bag may include securing means for securing the bag to a dispenser.

The securing means may comprise first securing means for securing a first part of the dispensing portion to a fixed part of the dispenser, and second securing means for securing a second part of the dispensing portion to a dispensing plunger mechanism forming part of the dispenser. The first and the second securing means may be closed loops or pads of interlocking plastics material such as those sold under the registered trade mark Velcro.

The bag may be made of any suitable and appropriate material. The bag will usually be made of a plastics material. A typical plastics material is polyethylene. The plastics material can be sealed where desired by any suitable and appropriate sealing means such for example as heat sealing or ultrasonic welding. The bag thus forms a flexible container which is easily and cheaply made.

The present invention also provides a dispenser when provided with the bag.

The dispenser may be a wall mounted dispenser or a free standing dispenser.

The dispenser will usually comprise a dispensing plunger mechanism. The dispensing plunger mechanism may comprise a spring biased return plunger.

BRIEF DESCRIPTION OF THE DRAWINGS

Embodiments of the invention will now be described solely by way of example and with reference to the accompanying drawings in which:

FIG. 4 is a side sectional view of a dispenser incorporating a bag in accordance with the invention;

FIG. 5 is a side view showing the bag used in FIG. 4 in a pre-use mode;

FIG. 6 is a side view like FIG. 5 but shows the bag in a ready-for-use mode;

FIG. 7 shows the bottom part of the bag of FIG. 4 and particularly illustrates first and second non-return valves;

FIG. 8 is a top view through the first non-return valve shown in FIG. 7;

FIG. 9 illustrates a first stage in forming a bag in accordance with the invention and in particular the first non-return valve;

FIG. 10 is a front view illustrating how the material shown in FIG. 9 is welded to form a bag of the invention;

FIGS. 11, 12 and 13 are perspective, front and sectional side views of a dispenser of the invention which may be a wall mounted dispenser or a free standing dispenser;

FIGS. 16, 17 and 18 show three variations of another bag of the invention;

FIGS. 26 and 27 are side and front views of another bag of the invention;

FIG. 41 is a sectional side view through another dispenser with a bag of invention;

FIG. 42 is a perspective view of the dispenser of FIG. 41, the dispenser being in a closed condition;

FIG. 43 is a perspective view of the dispenser of FIG. 41, the dispenser being in an open condition;

FIG. 44 is a perspective view of the bag in the dispenser of FIG. 41;

FIGS. 55, 56 and 57 illustrate the construction and operation of a pottery dispenser of the invention.

DESCRIPTION OF THE PREFERRED EMBODIMENTS

Figure 1:
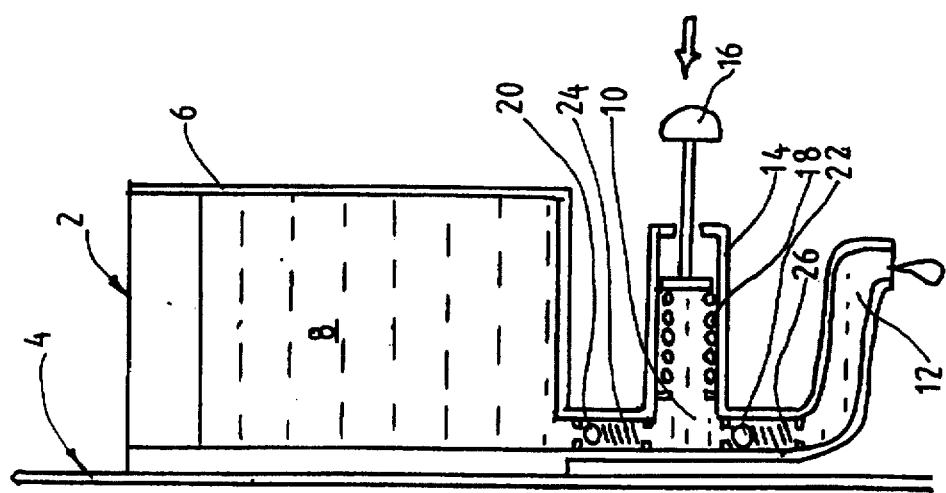
FIG. 1 is a side sectional view through a first known dispenser for fluid material.

Referring to FIG. 1, there is shown a wall mounted dispenser 2 which is mounted on a wall 4. The dispenser 2 has a rigid walled storage portion 6 for storing fluid material 8, and a dispensing portion 10 for receiving the fluid material 8 from the storage portion 6 and for dispensing it via a pipe 12. The dispensing portion 10 includes a pump 14 having a handle 16, a return spring 18 and ball valves 20, 22 which are biased by springs 24, 26 respectively. The dispensing portion 10 is expensive to manufacture.

Figure 3:
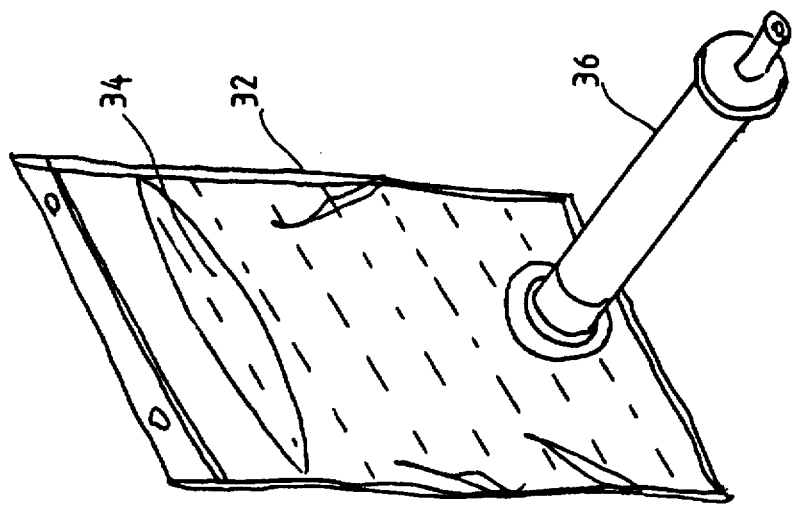
FIG. 3 is a perspective view of part of the dispenser shown in FIG. 2.
Figure 2:
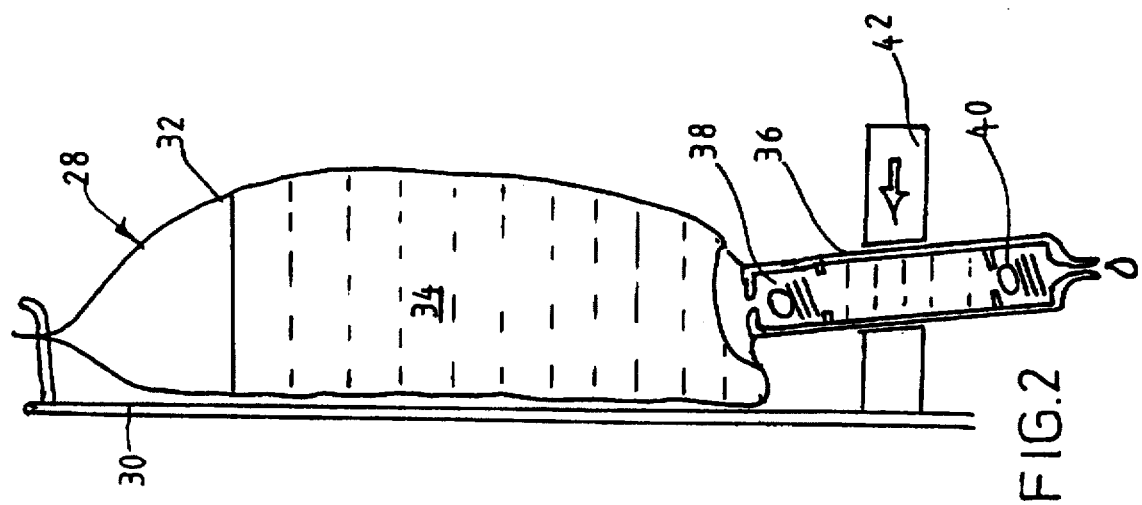
FIG. 2 is a side sectional view through a second known dispenser for fluid material.

FIGS. 2 and 3 show another wall mounted dispenser 28 for mounting to a wall. The dispenser 28 has a back plate 30 which supports a flexible bag forming a storage portion 32 for fluid material 34. The storage portion 32 leads into a dispensing portion in the form of a deformable tube 36 which is sealed to the bag forming the storage portion 32. The tube 36 has spring biased ball valves 38, 40 as shown. The dispensation of fluid material from the tube 36 is effected by a spring return plunger mechanism 42 which deforms the tube 36 in order to seal the ball valve 38 and open the ball valve 40 so the fluid material can be dispensed as shown. The ball valves 38, 40 make the dispenser 28 expensive to manufacture.

Referring now to FIG. 4, there is shown a bag 44 in accordance with the present invention. The bag 44 is mounted in a wall mounted dispenser 46. The bag 44 is for dispensing fluid material 48.

The bag 44 comprises a storage portion 50 for storing the fluid material 48, and a dispensing portion 52 for receiving the fluid material 48 from the storage portion 50. The bag 44 also comprises a first non-return valve 54 for controlling the passage of the fluid material 48 between the storage portion 50 and the dispensing portion 52. The bag 44 still further comprises a second non-return valve 56 for controlling the dispensation of the fluid material 48 from the dispensing portion 52. As will be explained in more detail hereinbelow, the first and the second non-return valves 54, 56 are made of flaps 58, 60: 62, 64 of material formed by sealing during the formation of the bag 44.

The first and the second non-return valves 54, 56 are such that the first non-return valve 54 closes when the second non-return valve 56 opens for fluid dispensing purposes. Also, the first non-return valve 54 opens when the second non-return valve 56 closes. Thus, in use, the bag 44 is able to operate such that when the dispensing portion 52 is squeezed, the fluid material 48 is dispensed from the dispensing portion 52 without being forced back into the storage portion 50. The bag 44 is also able to operate such that after the dispensation of the fluid material 48, the dispensing portion 52 is replenishable with fluid material 48 from the storage portion 50. The fluid material may be any suitable and appropriate material such for example as liquids, creams, gels or powders.

As can be seen from FIG. 4, the dispensing portion 52 is narrower than the storage portion 50 and it forms a neck portion of the bag 44.

As can best be seen from FIGS. 4, 5 and 6, the first non-return valve 54 comprises the flaps 58, 60 and these flaps 58, 60 are positioned inside the bag 44 but such that they are separate from side walls 66 of the bag 44.

As can be seen from FIG. 5, the pair of flaps 58, 60 are initially joined together at position 68 in order to seal the storage portion 50 from the dispensing portion 52 until such time as the bag 44 is to be used. This stops fluid material 48 in the storage portion 50 from passing to the dispensing portion 52 and thus possibly leaking through the second non-return valve 56, for example in the event that The storage portion 50 should be squeezed or otherwise subjected to pressure during packing and/or storage. The pair of flaps 58, 60 are constructed to be separable from one another by the application of pressure To the storage portion 50. When pressure is applied, the portion 68 ruptures and the fluid material 48 is able to flow into the dispensing portion 52 as shown in FIG. 6. The ruptured portion 68 is shown in FIGS. 7 and 8. The portion 68 is arranged to be rupturable by virtue of being made of a thinner material and the material employed for the side walls 66. The thinner material for the flaps 58, 60 is placed between the side walls 66 during initial stages of manufacture of the bag 44 as shown in FIG. 9.

The bag 44 is such that the second non-return valve 56 is formed by side wall portion of the dispensing portion 52, these side wall portions forming the flaps 62, 64.

The bag 44 includes first securing means in the form of a ring 70 for locating over and securing a first part 72 of the dispensing portion 52 to a fixed part in the form of a fixed hook 74 of the dispenser 46. There is also provided second securing means in the form of a ring 76 which fits over a hook 78 and which thus secures a second part 80 of the dispensing portion 52 to a dispensing plunger mechanism 82. The dispensing plunger mechanism 82 has a return spring (not shown).

As shown in FIG. 4, the flaps 62, 64 extend between a pair of resilient auxiliary flap seals 86, 88 which press on the flaps 62, 64 and help to prevent dripping of fluid material 48 through the second non-return valve 56.

Referring now to FIG. 10, there is shown how the bag 44 can be formed from sheets of plastics material forming the side walls 66 shown in FIG. 9, simply and easily by sealing at appropriate sealing areas 90, 92, 94, 96, 98. The sealing area 94 seals the flaps 58, 60 to the side walls 66. The sealing areas 96, 98 help to ensure that the flaps 58, 60 close when appropriate for dispensing the fluid material 48 from the dispensing portion 52. More specifically, the sealing areas 96, 98 help to ensure that the flaps 58, 60 do not unduly stick to the side of the side walls 66, which would hinder the closing of the flaps 58, 60.

During operation of the bag 44, squeezing of the dispensing portion 52 causes the flaps 58, 60 to close and the flaps 62, 64 to open to enable the dispensation of the fluid material 48. The required pressure on the dispensing portion 52 is effected by the dispensing plunger mechanism 82. When the dispensing plunger mechanism 82 returns to its non-dispensing position as shown in FIG. 4, it pulls the first part 72 and the second part 80 of the dispensing portion 52 away from each other. This action causes the flaps 62, 64 to close and the flaps 58, 60 to open so that fluid material 48 from the storage portion 50 can pass into the dispensing portion 52 for another dispensation of the fluid material. The closing of the flaps 62, 64 is assisted by the seals 86, 88. Thus the bag 44 is simply and cheaply able to be formed with required valves 54, 56 being formed in situ by appropriate sealing during formation of the bag 44.

If desired the dispenser shown in FIG. 4 can be moulded all in one piece.

In FIGS. 11 to 57, similar parts as in FIGS. 4 to 10 have been given the same reference numerals for ease of comparison and understanding.

Referring now to FIGS. 11, 12 and 13, the illustrated dispenser 46 can be a wall mounted dispenser or a free standing dispenser. Where the dispenser 46 is free standing, then the illustrated drip tray 100 also serves as a stand. The dispenser 46 is provided with a press portion 102, locating pegs 104, and an anti-drip sponge 106. As shown, the anti-drip sponge 106 is provided on the inside of the dispenser 46 just below the press portion 102. The dispenser 46 also has a saddle 108 for the dispensing portion 52. When the press portion 102 is depressed, the dispensing portion 52 is squeezed between the saddle 108.

Figure 14:
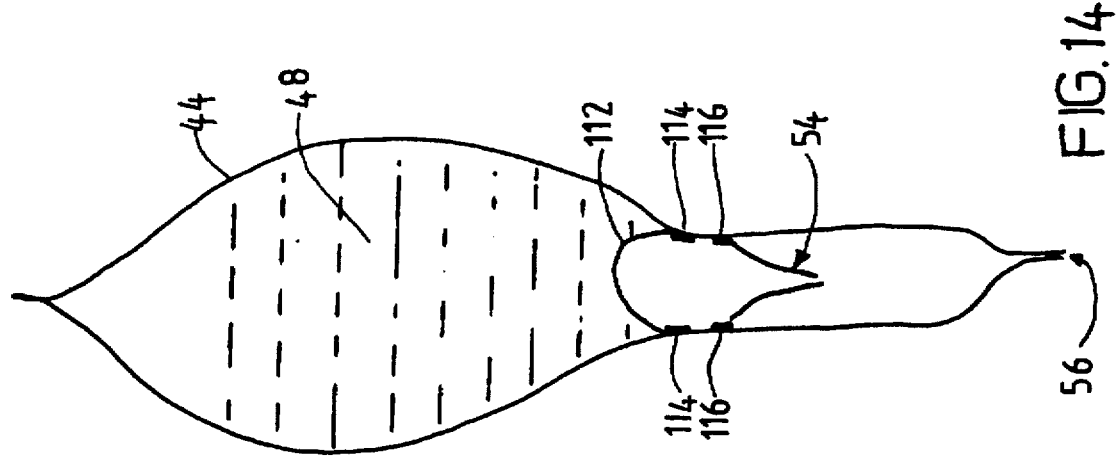
FIG. 14 is a sectional side view of a bag of the invention.

Referring to FIG. 14, it will be seen that the bag 44 has a membrane 112 formed of a thin burstable material. The membrane is sealed at seal 114. The first non-return valve 54 is formed from two flaps of material which are sealed at seals 116 and which are made of a thicker stronger material, as compared with the material employed for the membrane 112.

Figure 15:
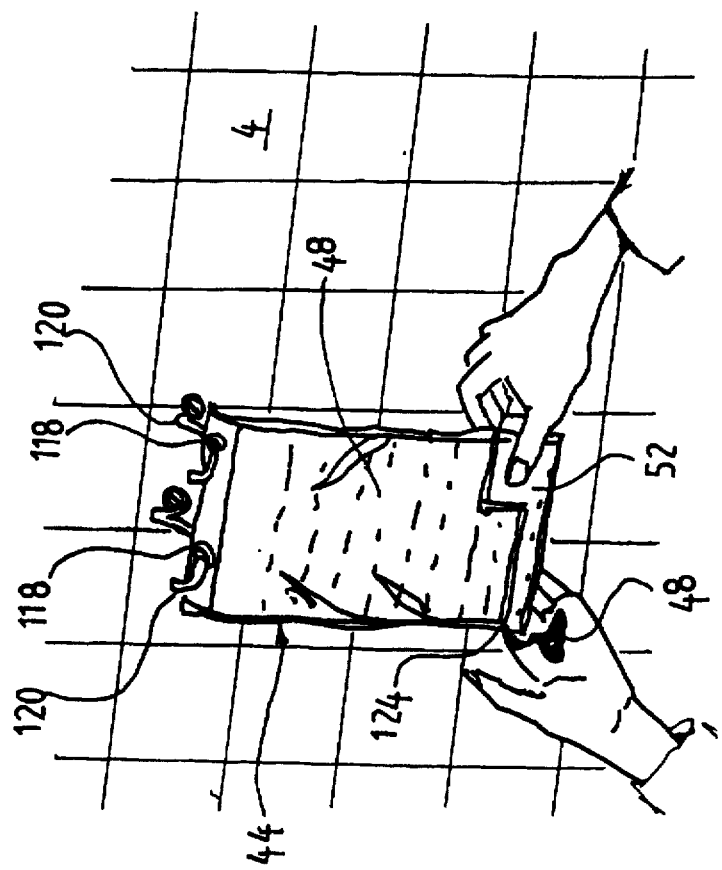
FIG. 15 is a perspective view of a wall mounted bag-type dispenser of the invention.

FIG. 15 shows a bag 44 with apertures 118 which have enabled the bag 44 to be hooked over hooks 120 projecting from the wall 4. The bag 44 is shown being squeezed over the dispensing portion 52 in order to cause dispensation of the fluid material 48.

FIG. 16 shows in more detail the type of bag 44. In particular, FIG. 16 shows the second non-return valve 16.

FIGS. 17 and 18 show two other constructions of the bag 44 which are similar to the bag 44 shown in FIG. 16 except that the second valve means 56 is located in other positions in FIGS. 17 and 18. With thin liquids 48, it is possible to use the bag 44 as a dispenser without the need for a hard outer case. The bag is simply operated by squeezing as described above and shown in the drawings.

Where the liquid 48 is very thin and flows well, then there is no need for Velcro (registered trade mark) or tabs with loops on the pump chamber and dispenser. The thin liquid is able to flow down, filling the pumping chamber 110 of its own accord.

Figure 19:
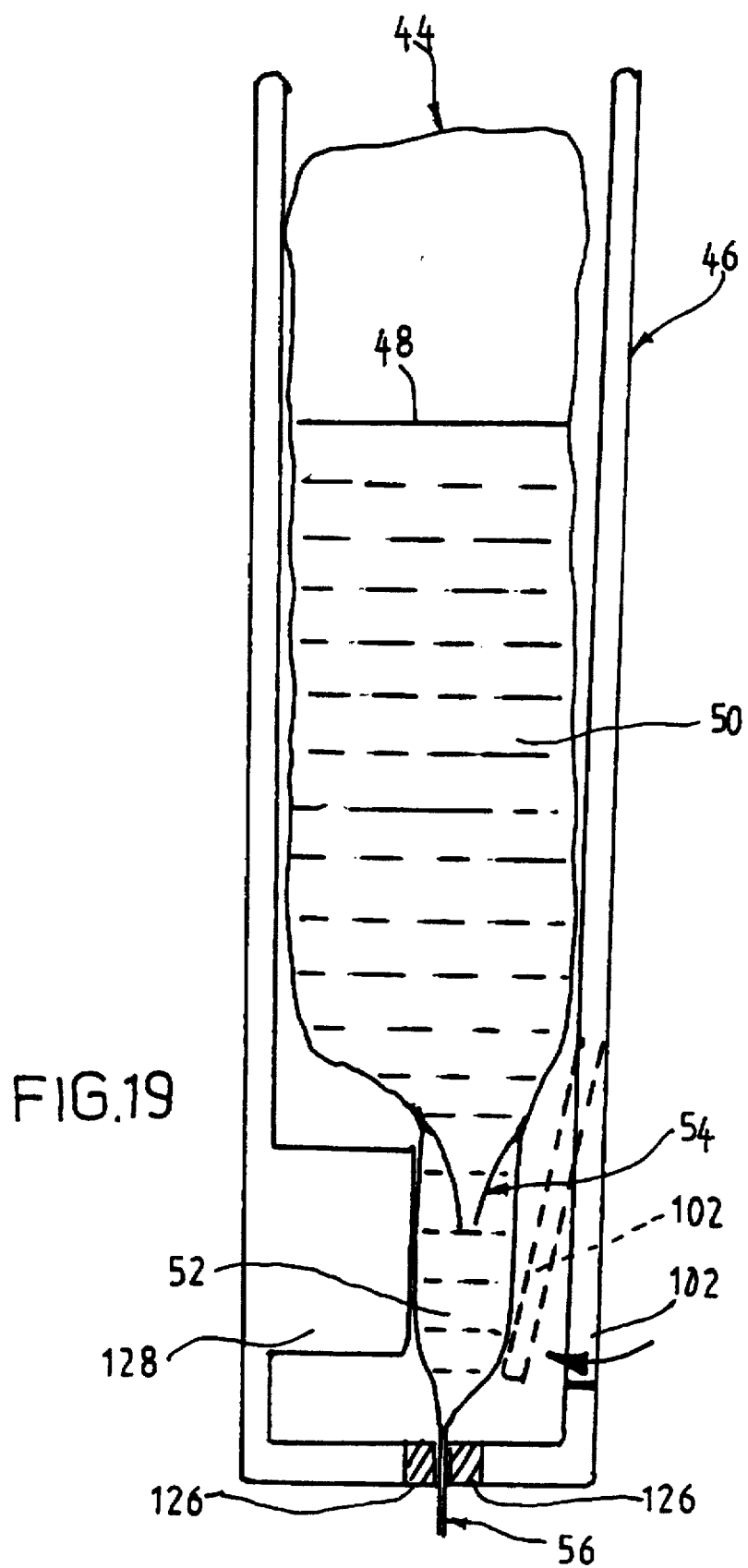
FIG. 19 is a sectional side view of another dispenser of the invention.

Referring now to FIG. 19, there is shown a side sectional view of a bag 44 in a dispenser 46. The dispenser 46 is provided with sponge material 126. The sponge material 126 helps to close the second non-return valve 56 and also helps to stops dripping of the fluid material 48. It will be seen that the dispenser 46 has a press portion 102. When the press portion 102 is pressed, the dispensing portion 52 of the bag is squeezed between the press portion 102 and an internal abutment portion 128 of the dispenser 46.

Figure 20:
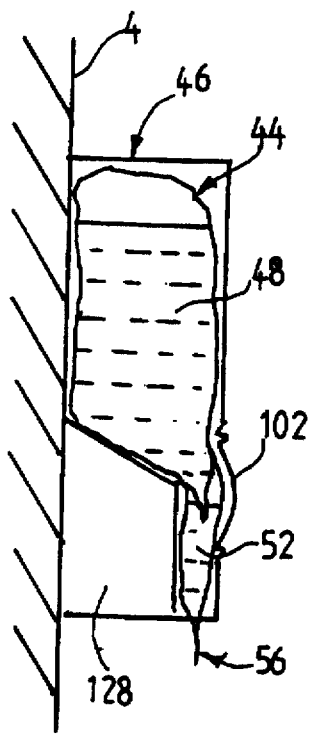
FIGS. 20, 21 and 22 are a side view before squeezing, a side view after squeezing, and a front view of another dispenser of the invention.
Figure 21:
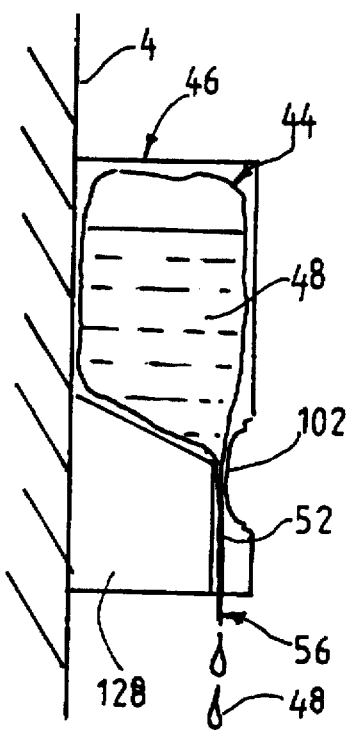
Figure 22:
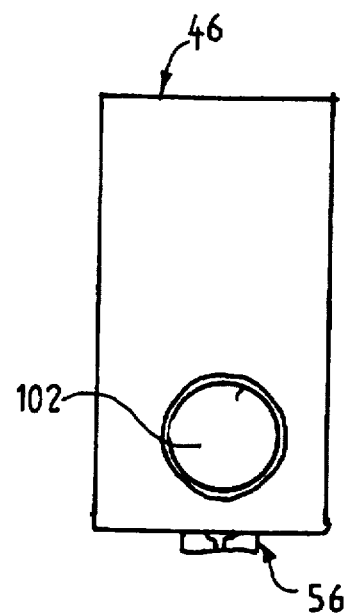

FIGS. 20, 21 and 22 show a dispenser 46 which is like the dispenser shown in FIG. 19 except that the press portion 102 is formed of a deformable material such as a plastics material, instead of being a movable flap. The depression of the press portion 102 can be seen by comparison of FIGS. 20 and 21.

Figure 23:
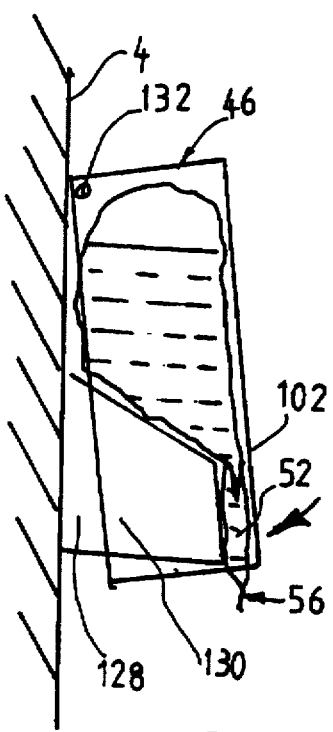
FIGS. 23, 24 and 25 are a side view before squeezing, a side view after squeezing, and a front view of another dispenser of the invention.
Figure 24:
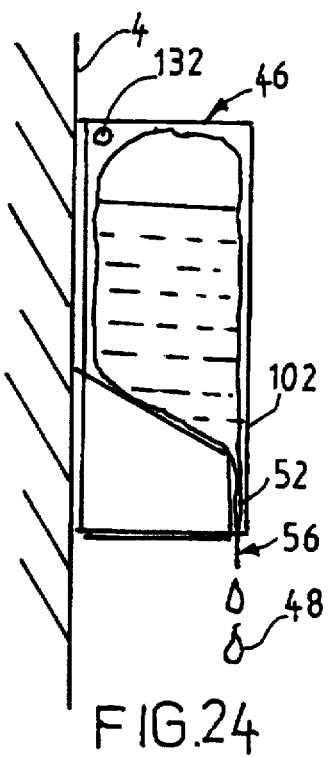
Figure 25:
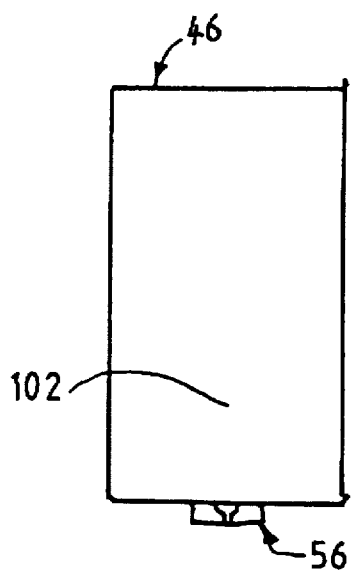

FIGS. 23, 24 and 25 show a variation of the arrangement shown in FIGS. 20, 21 and 22.

In FIGS. 20, 21 and 22, the press portion 102 is actually moved. In FIGS. 23, 24 and 25, the press portion 102 does not actually move but it causes a movable part 130 of the dispenser 46 to pivot and move closer to the internal abutment portion 128, thereby squeezing the dispensing portion 52 of the bag 44. The movable part 130 pivots about pivot 132.

Referring now to FIGS. 26 and 27, there is shown a bag 44 similar to that shown in FIGS. 5 and 6 except that in FIGS. 26 and 27, the flaps 58, 60 were initially separately formed and they did not initially form part of a single membrane. The flaps 58, 60 are joined to the walls of the bag 44 at seals 134. A cut or tear line 136 is provided in order to open the bag 44 and allow dispensation of the fluid 48.

Figure 29:
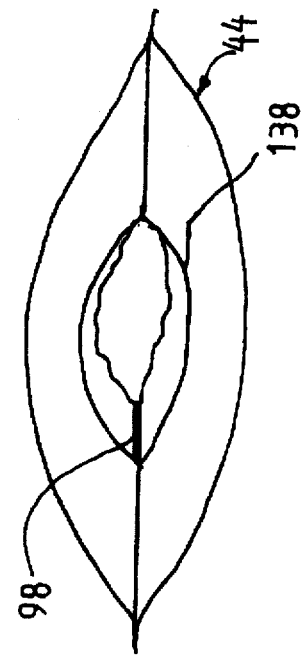
FIG. 29 is a section on line 29—29 shown in FIG. 28.
Figure 31:
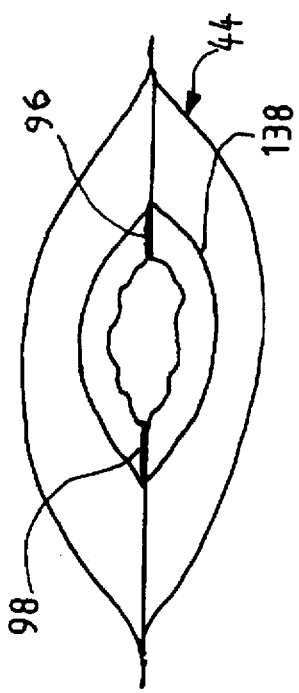
FIG. 31 is a section on line 31—31 shown in FIG. 30.
Figure 28:
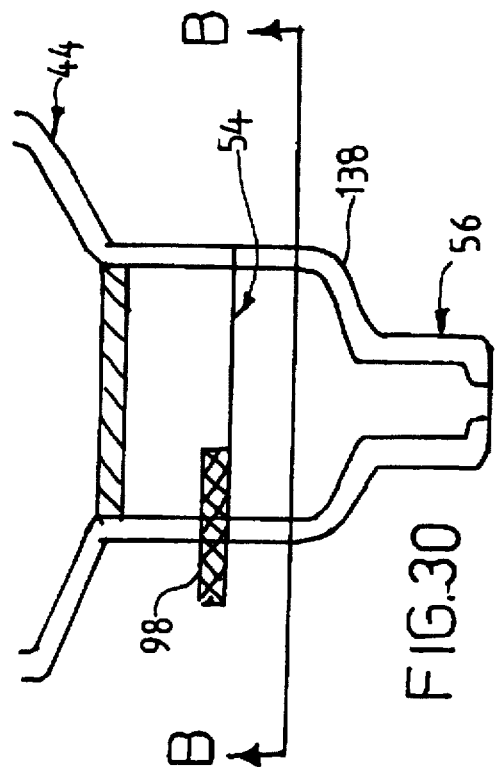
FIG. 28 is a section through another bag of the invention.
Figure 30:
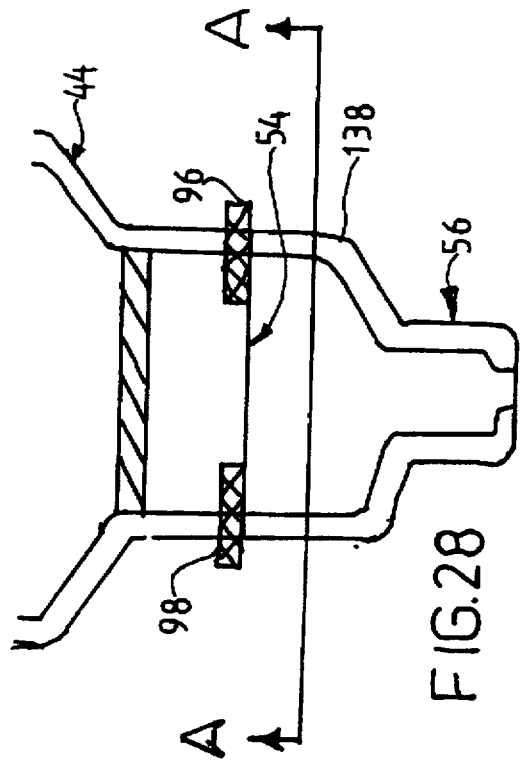
FIG. 30 is a section through another bag of the invention.

FIGS. 28 and 29 show in detail a possible construction for a bottom end portion of the bag 44. FIGS. 30 and 31 show a similar but alternative construction for the bottom end portion 138 of the bag 44.

Figure 32:
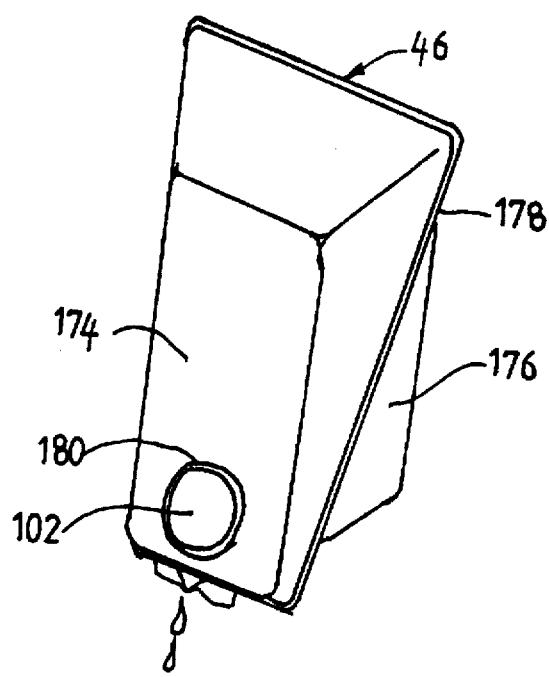
FIGS. 32 and 33 are perspective and sectional views of a another dispenser of the invention.
Figure 33:
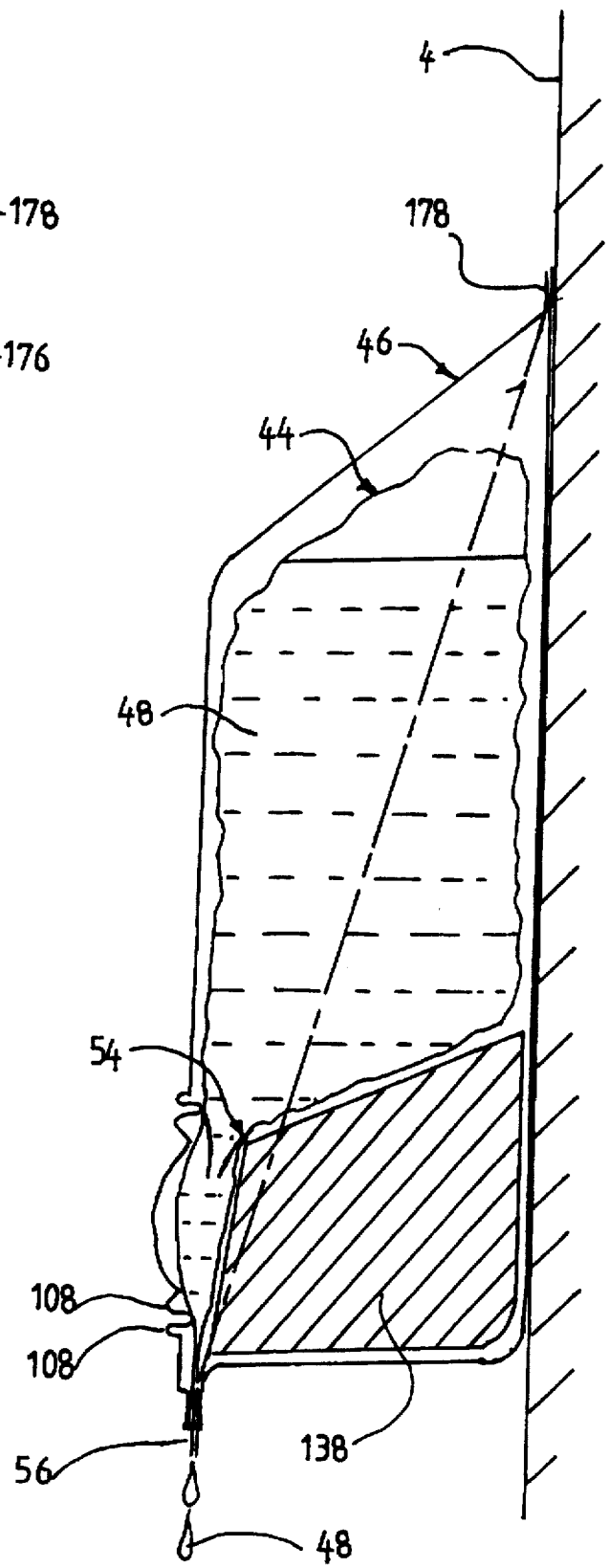

Referring to FIGS. 32 and 33, there is shown a dispenser 46 which is made of a thermoformed plastics material. The dispenser 46 has a first part 174 and a second part 176. If it is desired to use the dispenser 46 for several times before throwing it away, then the first and second parts 174, 176 can clip or otherwise fit together along line 178. The first and second parts 174, 176 can thus be separated to allow insertion of a new bag 44 when a previous bag is empty. If it is desired for the dispenser just to be used once and then thrown away, then the first and second parts 174, 176 can be sealed, for example by welding, along the line 178.

The dispenser 46 has a press portion 102 which is defined by a series of concentric rings 180. The rings 180 allow the press portion 102 to be depressed without deformation of the remainder of the first part 174. The rings 180 also allow the press portion 102 to return to its original position after pressing, so that the press portion 102 is then ready for the next press. The press portion 102 is advantageously arranged to be capable of 15–20 mm movement.

Figures 34, 35:
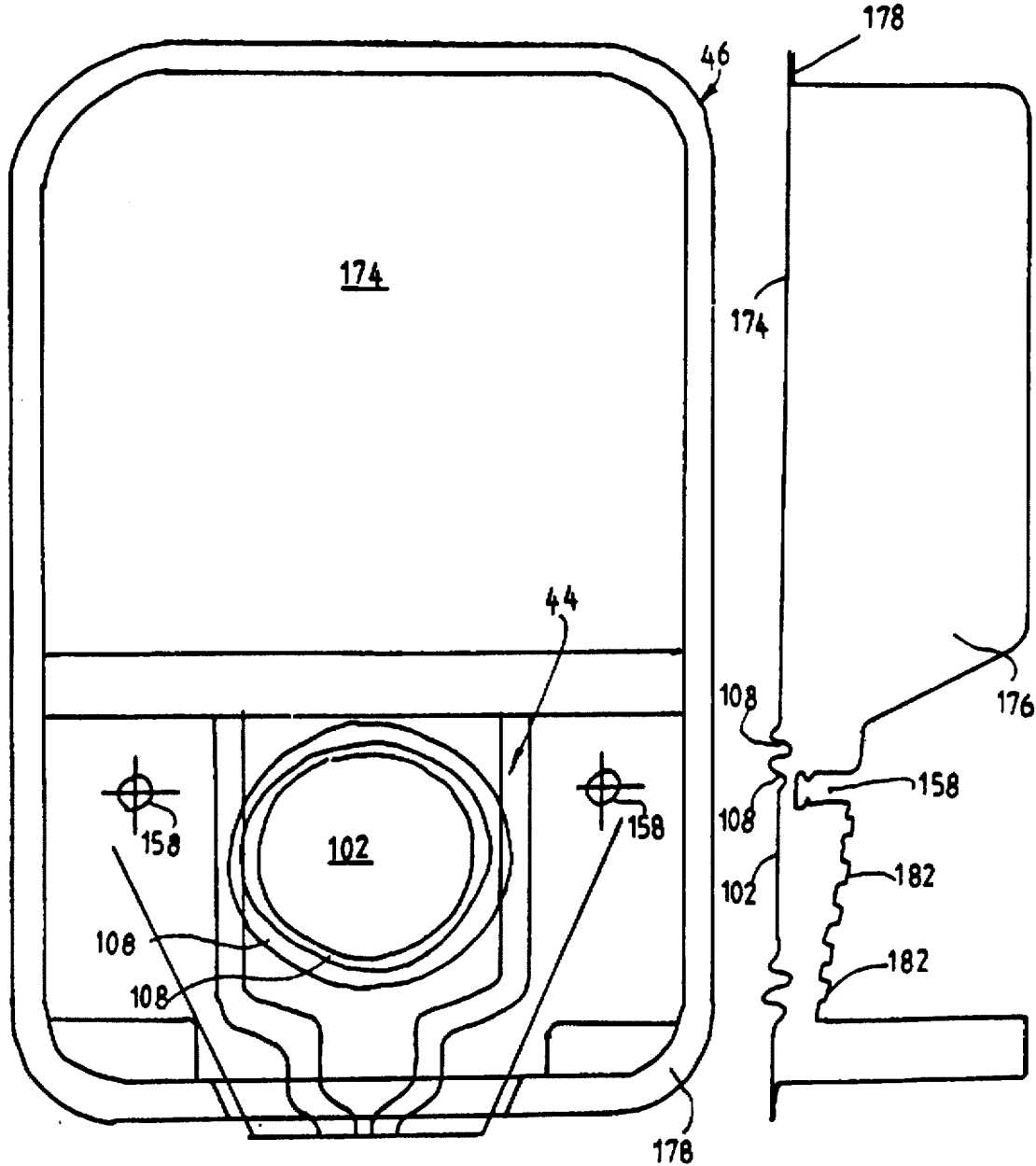
FIGS. 34 and 35 are front and side views of another dispenser of the invention.

Referring now to FIGS. 34 and 35 there is shown another thermoformed dispenser 46 and similar parts as in FIGS. 32 and 33 have been given the same reference numerals. For ease of understanding, the bottom part of the bag 44 has been shown in position in FIG. 34. The bag 44 locates on locating pegs 158 which extend from the second part 176 and pass through locating apertures in the bag 44. The second part 176 is provided with strengthening castellations 182. These strengthening castellations 182 may be replaced by rigid foam if desired.

Figure 37:
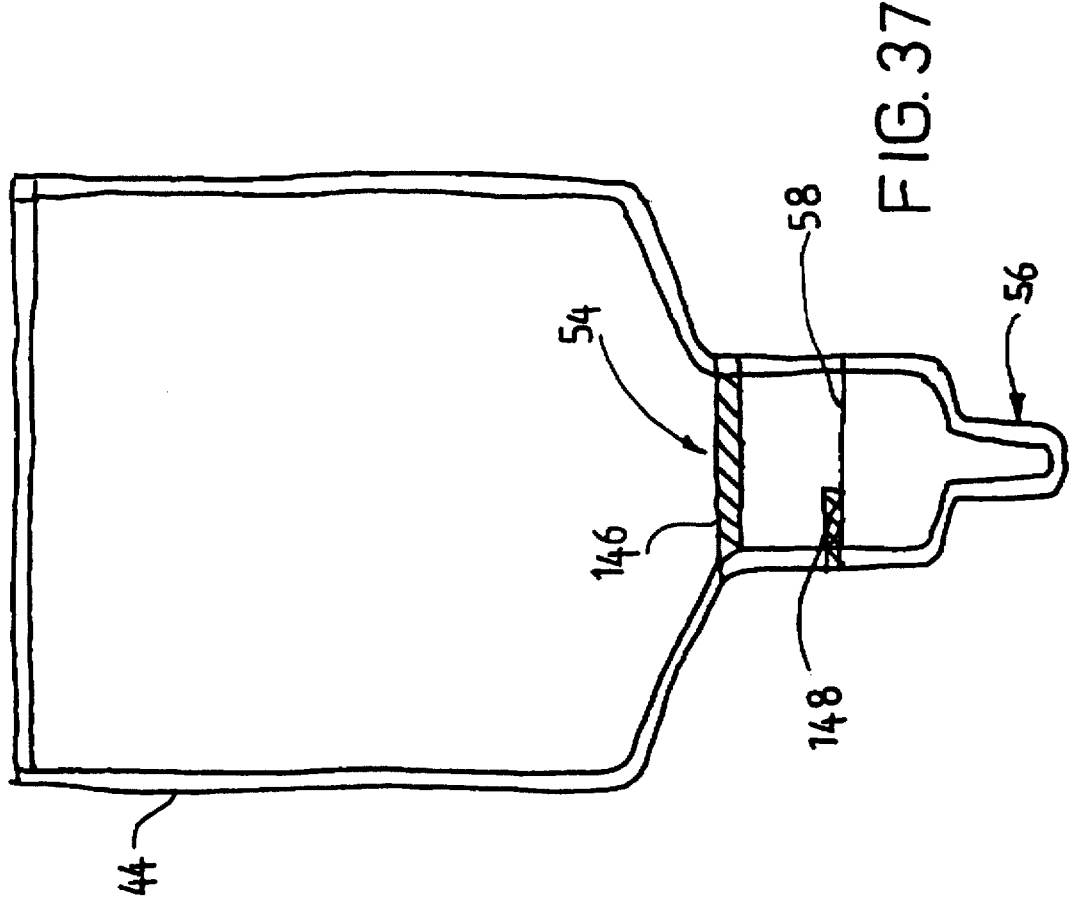
FIGS. 36 and 37 are side and front views of another bag of the invention.
Figure 36:
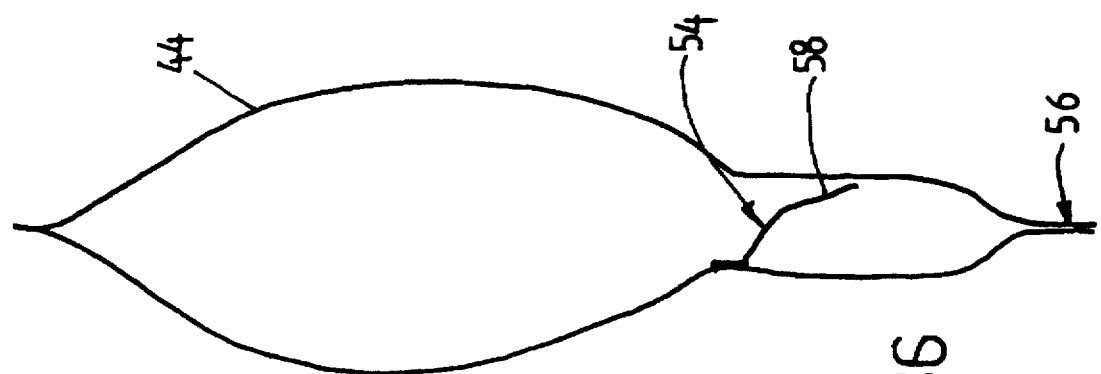

FIGS. 36, 37 show an arrangement in which the first non-return valve 54 is formed by a single flap 58. The bag 44 has seals 146 and 148. The seal 146 is sealed to the wall of one outer web. FIG. 36 illustrates how there is no need for a valve flap on each side of the bag 44.

Figure 39:
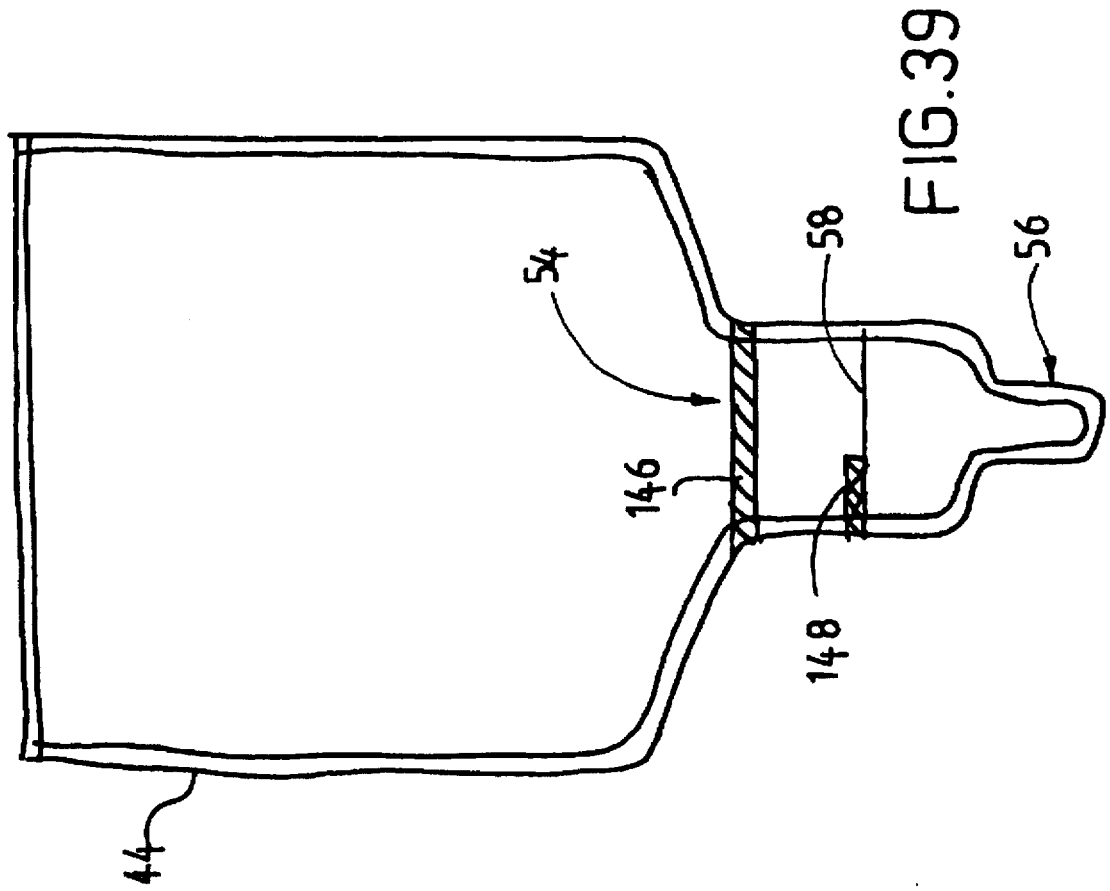
FIGS. 38 and 39 are side and front views of another bag of the invention.
Figure 38:
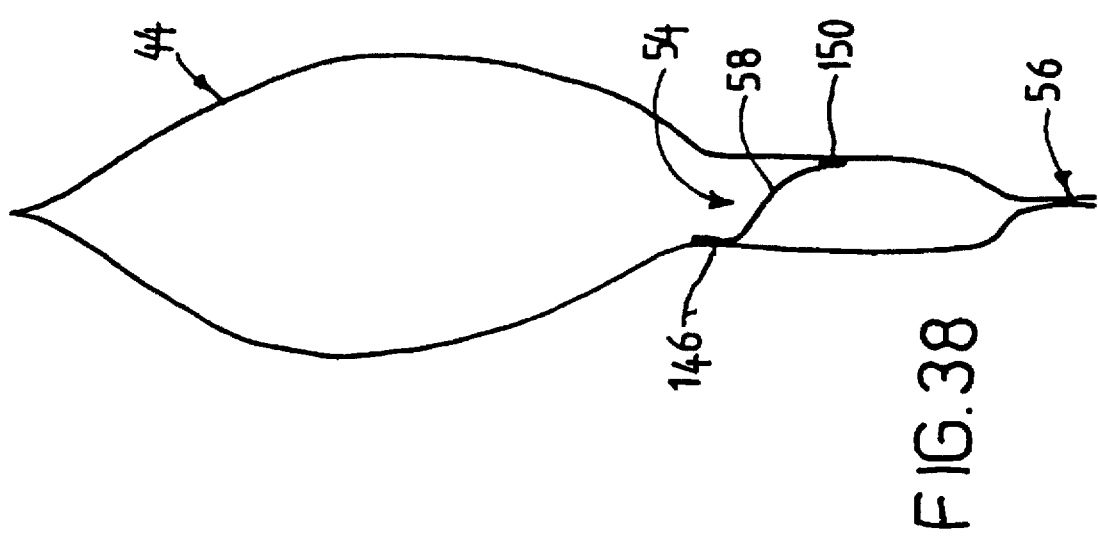

FIGS. 38 and 39 show a bag 44 which is similar to the bag 44 shown in FIGS. 36 and 37. In FIG. 38 it will be noted that the flap 58 is also sealed at seal 150 whereas the lower end of the flap 58 shown in FIG. 36 is free.

Figure 40:
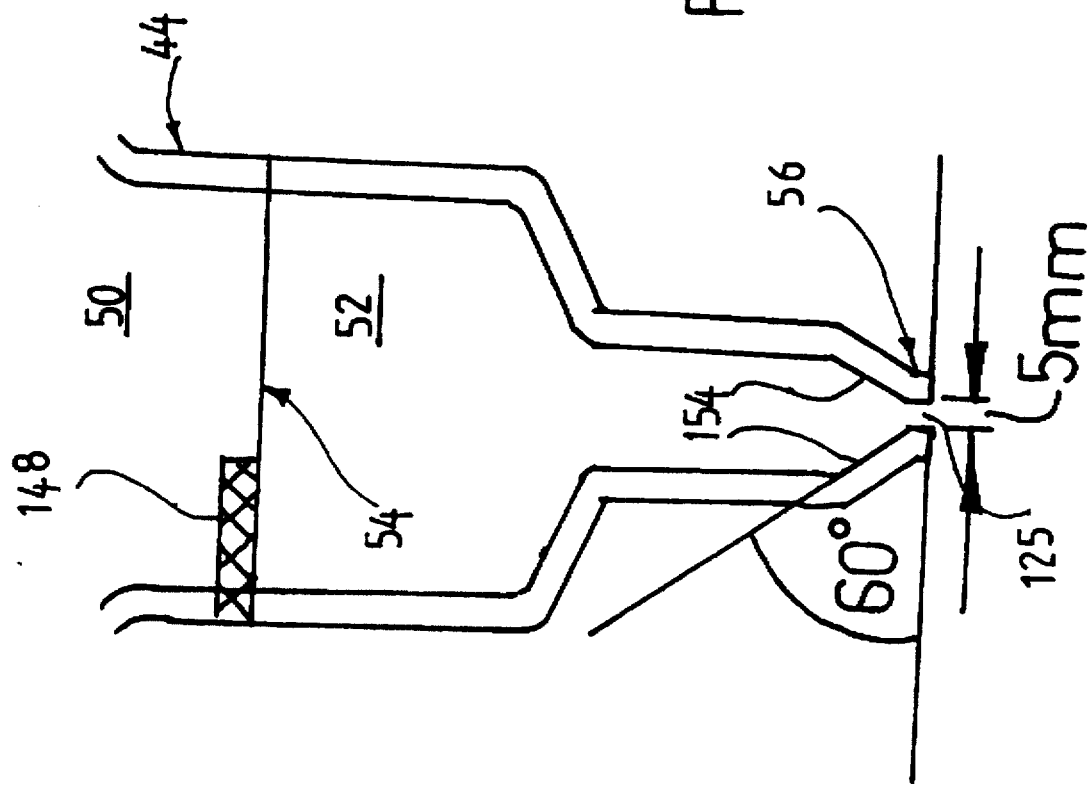
FIG. 40 illustrates a design feature of an exit aperture for a bag of the invention.
Figure 45:
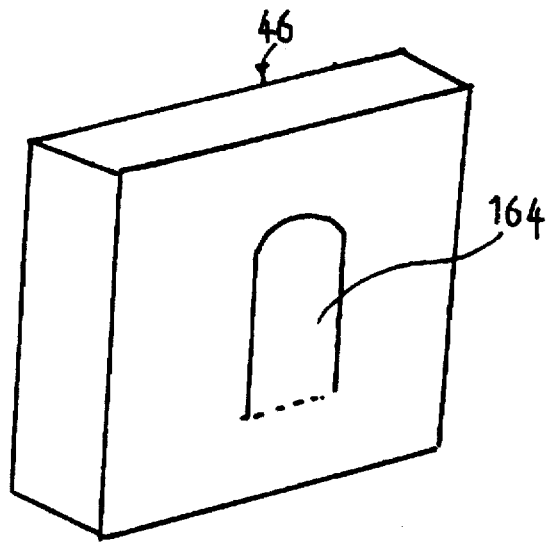
FIGS. 45, 46, 47 and 48 illustrate the construction and operation of a printed board dispenser of the invention.

FIG. 40 shows how the design of an exit aperture 152 may be important for cutting off unwanted drips of fluid material from the bag 44. Different angles and openings may be required for fluid material of different thickness. For thicker liquids, resilient flaps and deformable sponge should not normally be necessary since the design of the illustrated outlet will usually be sufficient to retain the fluid material in position. The exit aperture 152 as shown in FIG. 40 has a 5 mm opening and it is made by 60 degree portions 154 as shown.

FIGS. 41 to 43 show a bag 44 in a case-like dispenser 46. A bag 44 has locating apertures 156 for fitting over locating pegs 158 in the dispenser 46. The bag 44 also has locating apertures 160 for fitting over locating pegs 162 in the dispenser 46. The dispenser 46 has a press portion 102. The dispenser 46 can be made as a one piece moulding. The bag 44 can be used as a replaceable bag in the dispenser 44.

Figure 46:
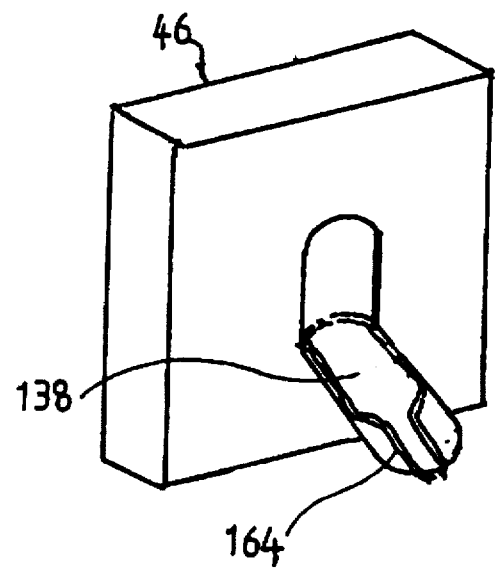
Figure 47:
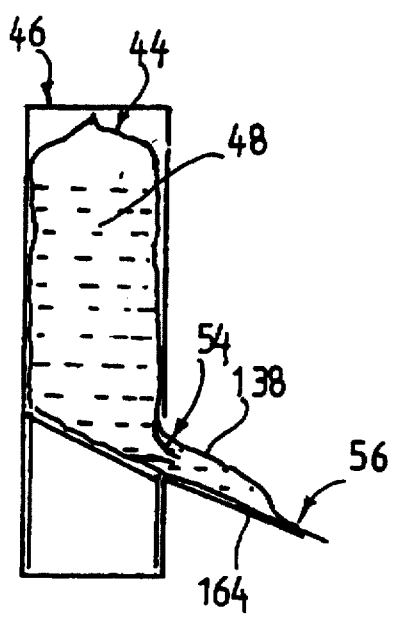
Figure 48:
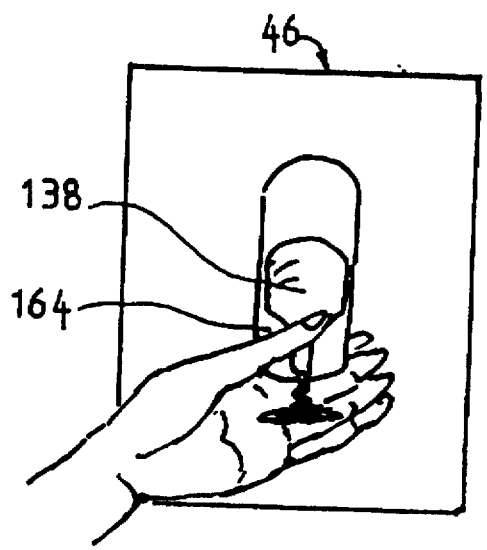

Referring now to FIGS. 45–48, there is shown a dispenser 46 which is made of printed board. The dispenser 46 has a pull out portion 164. When the pull out portion 164 is pulled out as shown in FIG. 46, a bottom end portion 138 of the bag 44 is shown. When this bottom end portion 138 is squeezed as shown in FIGS. 47 and 48, the fluid material 48 inside the dispensing portion 52 is obtained.

Figure 49:
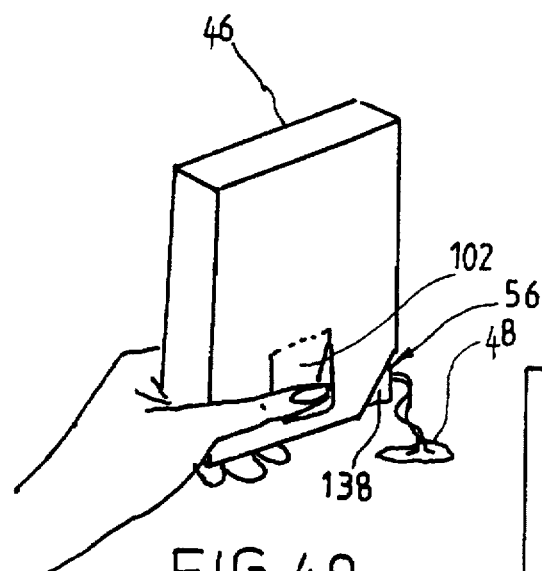
FIGS. 49, 50 and 51 illustrate the construction and operation of another printed board dispenser of the invention.
Figures 50, 51:
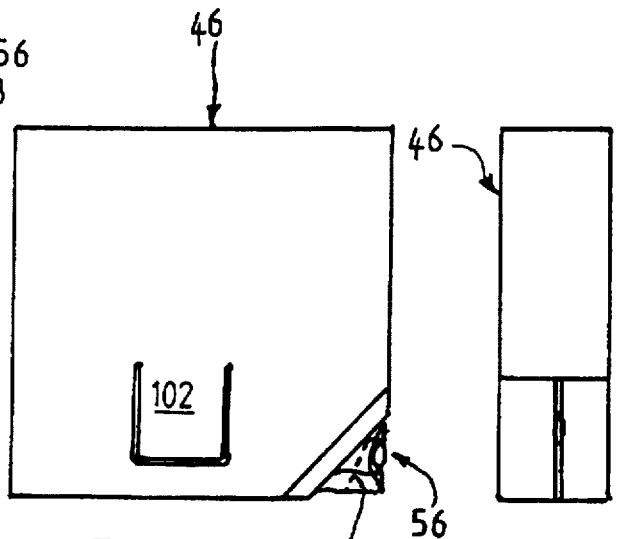

FIGS. 49, 50 and 51 show another dispenser 46 which is made of printed board. The dispenser 46 this time has a press portion 102. The bottom end portion 138 of the bag 44 is located in the bottom right hand corner of the dispenser 46 as shown from FIGS. 49 and 50. The dispenser 46 shown in FIGS. 49–51 is adapted to be free standing and hand holdable as indicated in FIG. 49.

Figure 52:
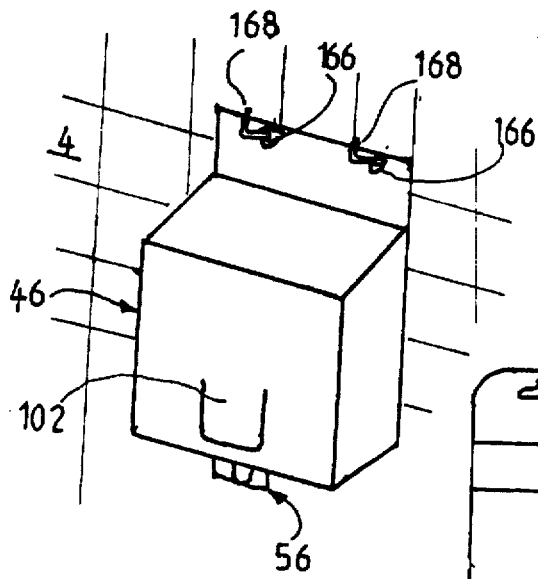
FIGS. 52, 53 and 54 illustrate the construction and operation of another printed board dispenser of the invention.
Figure 53:
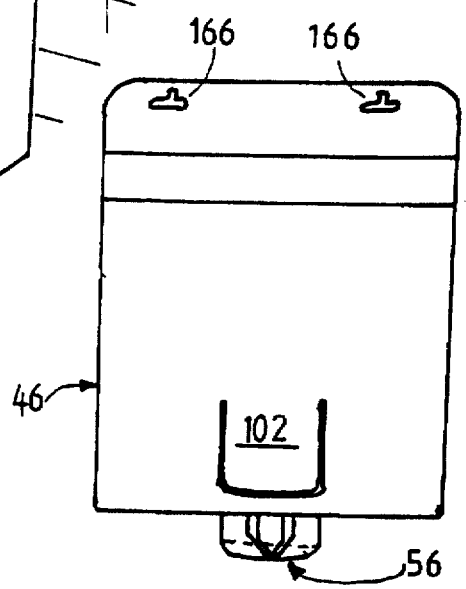
Figure 54:
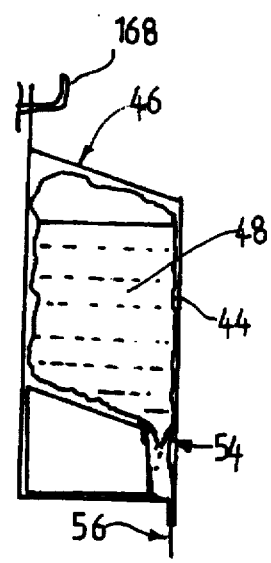

FIGS. 52, 53 and 54 show a dispenser 46 which is also made from the printed board. The dispenser 46 shown in FIGS. 52, 53 and 54 is provided with locating apertures 166 which locate over pegs 168 protruding from a wall 4. Thus the dispenser 46 is hung from the pegs 168. When the press portion 102 is pressed, the bag 44 is squeezed against an internal abutment portion 128 which is provided inside the dispenser 46 and which is also made of board.

FIGS. 55, 56 and 57 show a dispenser 46 with a formed lip 170. The bottom end portion 138 of the bag 44 extends through an aperture 172 in the dispenser 46 as shown in the drawings. When the bottom end portion 138 is squeezed, the fluid material 48 is obtained. The dispenser 46 shown in FIGS. 55, 56 and 57 can be made to look like known tea, coffee and sugar pottery containers except that it is also provided with the lip 170.

It is to be appreciated that the embodiments of the invention described above with reference to the accompanying drawings have been given by way of example only and that modifications may be effected. Thus, for example, the dispensers shown in FIGS. 45–54 can be made of various types and thicknesses of cardboard. The cardboard can easily be printed or otherwise provided with instructions, advertising material or any other suitable and appropriate information. Materials other than cardboard may be employed if desired. The securing rings 70, 76 may be replaced by pads of Velcro (registered trade mark) material or other securing means. The bag 44 may be of a different shape than shown and it may be mounted on other types of dispensers, for example free standing dispensers. If it is desired that the portion 68 should not be rupturable on the application of pressure, then other means can be employed for breaking this portion or it may be omitted altogether. For example, if the portion 68 is omitted, then an additional seal 101 shown in FIG. 10 may be employed to effect a complete closure of the bag during transport. The seal 101 can then be cut or torn off at the time when the bag is installed into a dispenser. When the fluid material 48 has been introduced into the storage portion 50, the top of the bag can be sealed by a seal 100. This seal 100 can be a welded seal or a clip type seal, or any other suitable and appropriate type of seal. Any suitable and appropriate type of fluid material may be dispensed including liquids, creams, paints and edible fluid materials such for example as sauces, mayonaise and soups. The precise construction and operation of the first and the second non-return valves may be varied in dependence upon the viscosity of the fluid material to be dispersed. For thin fluid materials, the second non-return valve may need auxiliary pressure from an external arrangement separately formed from the bag in order to provide a required seal.

We claim:

1. A dispenser comprising a bag for dispensing fluid material, which bag comprises a storage portion for storing the fluid material, a dispensing portion for receiving the fluid material from the storage portion, a first non-return valve for controlling the passage of fluid material between the storage portion and the dispensing portion, and a second non-return valve for controlling the dispensation of the fluid material from the dispensing portion: the first and the second non-return valves each having flaps of material formed by sealing during the formation of the bag; and the first and the second non-return valves being such that the first non-return valve closes when the second non-return valve opens for fluid dispensing purposes, and the first non-return valve opens when the second non-return valve closes, whereby in use the bag operates such that when the dispensing portion is squeezed the fluid material is dispensed from the dispensing portion without being forced back into the storage portion, and such that after the dispensation of the fluid material, the dispensing portion is replenishable with fluid material from the storage portion.

2. A bag according to claim 1 in which the dispensing portion is narrower than the storage portion.

3. A bag according to claim 2 in which the first non-return valve comprises a pair of flaps which are positioned inside the bag and which are separate from side walls of the bag.

4. A bag according to claim 3 in which the pair of flaps are formed to be joined together to seal the storage portion from the dispensing portion until such time as the bag is to be used.

5. A bag according to claim 4 in which the pair of flaps are constructed to be separable from one another by the application of pressure to the storage portion.

6. A bag according to claim 1 in which the second non-return valve is formed by side wall portions of the dispensing portion of the bag.

7. A bag according to claim 1 and including securing means for securing the bag to a dispenser.

8. A bag according to claim 7 in which the securing means comprise first securing means for securing a first part of the dispensing portion to a fixed part of the dispenser, and second securing means for securing a second part of the dispensing portion to a dispensing plunger mechanism forming part of the dispenser.

9. A dispenser according to claim 1 and which is a wall mounted dispenser or a free standing dispenser.

* * * * *